US012785566B2

(12) United States Patent
Kim et al.

(10) Patent No.: US 12,785,566 B2
(45) Date of Patent: Nov. 3, 2026

(54) BUCK-BOOST CONVERTER CONFIGURED TO SEAMLESSLY COMPENSATE FOR OUTPUT RIPPLE, ELECTRONIC CIRCUIT INCLUDING THE SAME, AND OPERATING METHOD THEREOF

(71) Applicant: Samsung Electronics Co., Ltd., Suwon-si (KR)

(72) Inventors: Minwoo Kim, Suwon-si (KR); Hyungju Park, Suwon-si (KR); Minyong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 18/678,387

(22) Filed: May 30, 2024

(65) Prior Publication Data

US 2024/0421709 A1 Dec. 19, 2024

(30) Foreign Application Priority Data

Jun. 15, 2023 (KR) ........................ 10-2023-0076913
Oct. 17, 2023 (KR) ........................ 10-2023-0139024

(51) Int. Cl.
*H02M 3/158* (2006.01)
*H02M 1/00* (2006.01)

(52) U.S. Cl.
CPC ....... *H02M 3/1582* (2013.01); *H02M 1/0009* (2021.05); *H02M 1/0022* (2021.05)

(58) Field of Classification Search
CPC ....... H02M 3/1582; H02M 1/14; H02M 1/143
See application file for complete search history.

(56) References Cited

U.S. PATENT DOCUMENTS 8,638,155 B2 1/2014 Notman et al.
9,407,144 B2 8/2016 Ozanoglu et al.
10,250,141 B2 4/2019 Zhang
10,291,125 B2 5/2019 Raval et al.
10,534,384 B2 1/2020 Manlove et al.
10,637,357 B1 * 4/2020 Zhan ..................... H02M 3/157
10,644,600 B2 * 5/2020 Wu ..................... H02M 3/1563
10,756,627 B2 8/2020 Hsu et al.
(Continued)

FOREIGN PATENT DOCUMENTS

KR 101713359 B1 3/2017

*Primary Examiner* — Alex Torres-Rivera
(74) *Attorney, Agent, or Firm* — Wolf, Greenfield & Sacks, P.C.

(57) ABSTRACT

An electronic circuit includes a buck-boost converter and controller. The converter includes an inductive element, a plurality of switches and a plurality of drivers therein, and is configured to generate an output voltage in response to an input voltage. The controller configured to: (i) generate a ramp signal having a reset timing that is delayed as the input voltage decreases, (ii) generate a sensing voltage having a magnitude that is a function of a magnitude of an inductor current in the inductive element, (iii) generate a feedback voltage having a magnitude that is a function of a magnitude of the output voltage, (iv) generate a compensation voltage in response to the feedback voltage and a reference voltage, and (v) uniformly maintain the compensation voltage based on the ramp signal and the sensing voltage, and independent of any change in the input voltage.

16 Claims, 19 Drawing Sheets

(56) References Cited

U.S. PATENT DOCUMENTS

| | | | | |
|---|---|---|---|---|
| 2011/0074373 | A1* | 3/2011 | Lin | H02M 3/1582<br>323/282 |
| 2022/0224230 | A1 | 7/2022 | Chakkirala | |

* cited by examiner

BUCK-BOOST CONVERTER CONFIGURED TO SEAMLESSLY COMPENSATE FOR OUTPUT RIPPLE, ELECTRONIC CIRCUIT INCLUDING THE SAME, AND OPERATING METHOD THEREOF

REFERENCE TO PRIORITY APPLICATION

This application claims priority under 35 U.S.C. § 119 to Korean Patent Application Nos. 10-2023-0076913, filed Jun. 15, 2023, and 10-2023-0139024, filed Oct. 17, 2023, the disclosures of which are hereby incorporated herein by reference.

BACKGROUND

Embodiments of the present disclosure described herein relate to DC-DC converters and, more particularly, to buck-boost converters that are capable of seamlessly compensating for an output ripple at a boundary of a buck mode and a boost mode.

Nowadays, various types of electronic devices such as smartphones and tablets are being used; an electronic device typically performs unique functions based on operations of various electronic circuits included in the electronic device, and may operate based on power (e.g., a voltage and a current) supplied from a power source (e.g., a battery or an external power source). Some electronic circuits may provide voltage conversion (e.g., direct current (DC)-DC conversion) to supply the power necessary for operations of other electronic circuits. For example, some electronic circuits may increase or decrease the level of the voltage output from the power source and may output a voltage with a converted level. For example, a buck converter, a boost converter, a buck-boost converter, etc. may be used to perform the above conversion, such that the converted voltage may be generated to have a level suitable for an operation of an electronic circuit.

Meanwhile, the buck-boost converter may operate in a buck mode, a buck-boost mode, or a boost mode depending on a level of an input voltage and a level of an output voltage. However, a ratio at which feed-forward compensation is applied may vary depending on an operation mode of the buck-boost converter. In addition, there is required a scheme capable of seamlessly compensating for an output ripple at the boundary between the operation modes of the buck-boost converter.

SUMMARY

Embodiments of the present disclosure provide a buck-boost converter capable of seamlessly compensating for an output ripple at the boundary of a buck mode and a boost mode.

Embodiments of the present disclosure provide feed-forward compensation that delays a reset timing of a ramp signal by using a pulse with an emulated duty ratio.

Embodiments of the present disclosure provide feed-forward compensation that compensates for a voltage, which corresponds to an inductor current, by using a pulse with an emulated duty ratio.

According to an embodiment, an electronic circuit includes a buck-boost converter containing: an inductive element, a first switch electrically connected between an input terminal receiving an input voltage and a first end of the inductive element, a second switch electrically connected between the first end of the inductive element and a ground electrode, a third switch electrically connected between a second end of the inductive element and the ground electrode, a fourth switch electrically connected between the second end of the inductive element an output terminal outputting an output voltage, a first driver for driving the first switch and the second switch, and a second driver for driving the third switch and the fourth switch, and a controller. According to some embodiments, the controller is configured to: generate a ramp signal having a reset timing that is delayed as the input voltage decreases, based on the input voltage and the output voltage, generate a sensing voltage corresponding to an inductor current flowing through the inductive element, generate a feedback voltage based on the output voltage, generate a compensation voltage based on the feedback voltage and a reference voltage, and uniformly maintain the compensation voltage based on the ramp signal and the sensing voltage regardless of a change in the input voltage.

According to an embodiment, an electronic circuit includes a buck-boost converter that contains an inductive element and outputs an output voltage based on an input voltage, and a controller that controls the buck-boost converter. The controller performs first feed-forward compensation based on the input voltage and the output voltage such that a reset timing of a ramp signal is delayed as the input voltage decreases, performs second feed-forward compensation such that a sensing voltage corresponding to an inductor current flowing through the inductive element is generated, generates a feedback voltage based on the output voltage, generates a compensation voltage based on the feedback voltage and a reference voltage, and uniformly maintains the compensation voltage based on the first feed-forward compensation and the second feed-forward compensation, regardless of a change in the input voltage.

According to another embodiment, an operating method of an electronic circuit, which includes a buck-boost converter including an inductive element and outputting an output voltage based on an input voltage and a controller controlling the buck-boost converter, includes: generating a first pulse with a first emulated duty ratio and a second pulse with a second emulated duty ratio, generating a delayed ramp signal based on the first pulse and the second pulse, generating a sensing voltage corresponding to an inductor current flowing through the inductive element by sensing the inductor current, generating a compensation voltage by amplifying a difference between a feedback voltage based on the output voltage and a reference voltage, generating a control signal by comparing an emulated voltage, which is obtained by adding the delayed ramp signal and the sensing voltage, and the compensation voltage, and generating a first gate control signal and a second gate control signal based on the control signal, a first clock, and a second clock.

BRIEF DESCRIPTION OF THE FIGURES

The above and other objects and features of the present disclosure will become apparent by describing in detail embodiments thereof with reference to the accompanying drawings.

DETAILED DESCRIPTION OF EMBODIMENTS

Below, embodiments of the present disclosure will be described in detail and clearly to such an extent that an ordinary one in the art easily carries out the present disclosure. In this detailed description, components described with reference to the terms "part", "unit", "module", "block", etc., and function blocks illustrated in drawings, may be implemented with software, hardware, or combinations thereof. For example, the software or other program instructions may be machine code, firmware, an embedded code, and application software. In addition, examples of hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
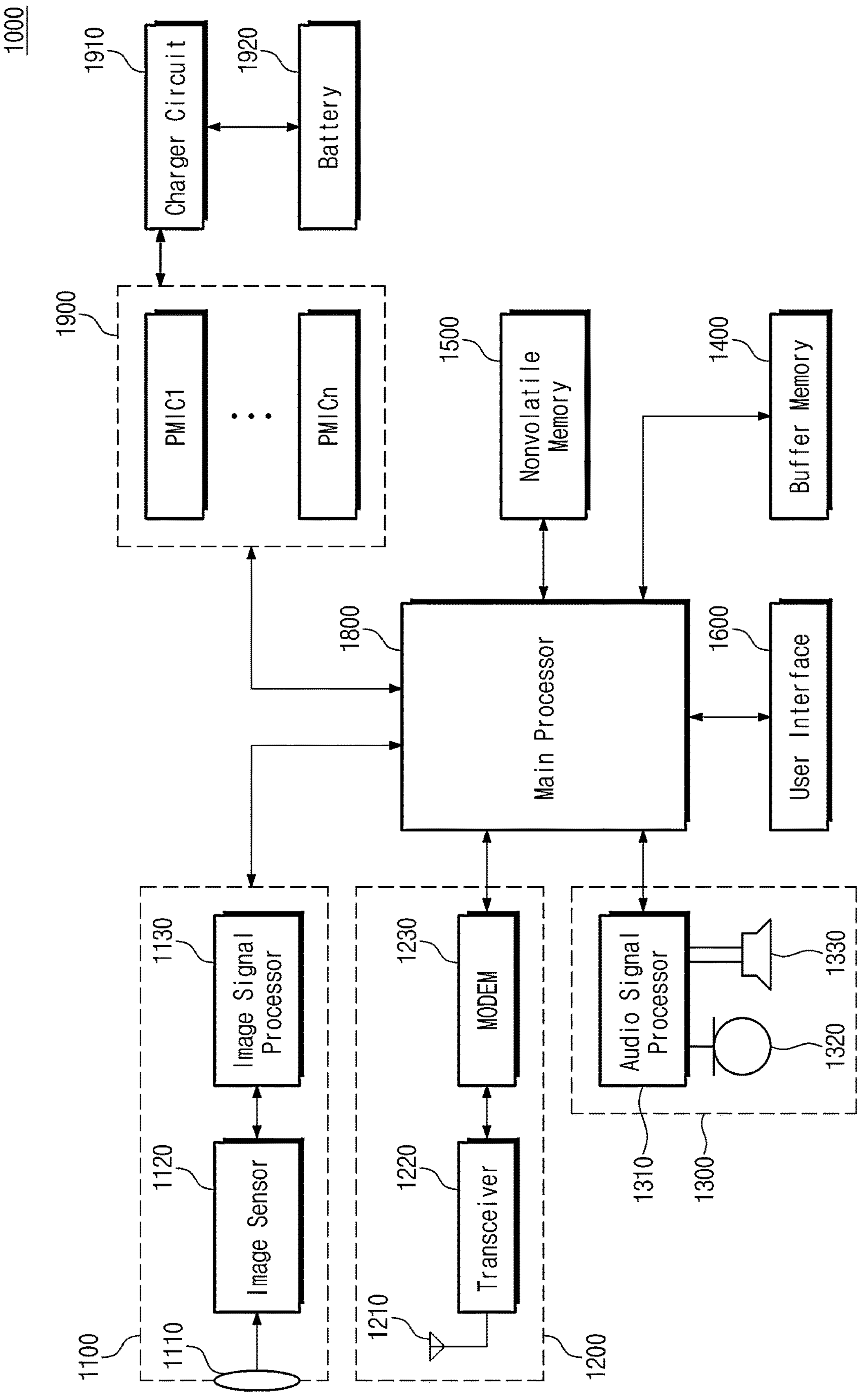
FIG. 1 is a block diagram illustrating a configuration of an electronic device capable of including an electronic circuit according to an embodiment of the present disclosure.

FIG. 1 is a block diagram illustrating a configuration of an electronic device 1000 capable of including an electronic circuit according to an embodiment of the present disclosure. The electronic device 1000 may be implemented with one of various types of electronic devices such as a smartphone, a wearable device, a tablet computer, a desktop computer, a laptop computer, a workstation, a server, an electric vehicle, home appliances, and medical appliances.

The electronic device 1000 may include various electronic circuits, such as an image processing block 1100, a communication block 1200, an audio processing block 1300, a buffer memory 1400, a nonvolatile memory 1500, a user interface 1600, a main processor 1800, a power management circuit 1900, and a charger circuit 1910. The electronic device 1000 may be connected to a battery 1920, and the battery 1920 may supply power that is used in an operation of the electronic device 1000; however, the present disclosure is not limited thereto. For example, the power that is supplied to the electronic device 1000 may be supplied from any other internal/external power source, in addition to the battery 1920.

The image processing block 1100 may receive light through a lens 1110. An image sensor 1120 and an image signal processor 1130 that are included in the image processing block 1100 may generate image information associated with an external subject, based on the received light. The communication block 1200 may exchange signals with an external device/system through an antenna 1210. A transceiver 1220 and a MODEM (Modulator/Demodulator) 1230 of the communication block 1200 may process signals, which are exchanged with the external device/system, in compliance with one or more of various wired/wireless communication protocols. The audio processing block 1300 may process sound information by using an audio signal processor 1310, may receive an audio input through a microphone 1320, and may output an audio through a speaker 1330.

The buffer memory 1400 may store data used in an operation of the electronic device 1000. For example, the buffer memory 1400 may temporarily store data processed or to be processed by the main processor 1800. In some embodiments, the buffer memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM). As will be understood by those skilled in the art, the nonvolatile memory 1500 may store data regardless of whether a power is supplied. For example, the nonvolatile memory 1500 may include at least one of various nonvolatile memories such as a flash memory, a PRAM, an MRAM, a ReRAM, and a FRAM, and may include a removable memory such as a secure digital (SD) card or a solid state drive (SSD), and/or an embedded memory such as an embedded multimedia card (eMMC).

The user interface 1600 may arbitrate the communication between the user and the electronic device 1000. For example, the user interface 1600 may include an input interface for receiving an input from the user and an output interface for providing information to the user.

The main processor 1800 may control overall operations of the components of the electronic device 1000, and may perform various operations for the purpose of operating the electronic device 1000. For example, the main processor 1800 may be implemented with a general-purpose processor, a special-purpose processor, an application-specific processor, or a microprocessor and may include one or more processor cores.

The power management circuit 1900 and the charger circuit 1910 may supply a power which is used in an operation of the electronic device 1000. This will be described with reference to the block diagram of FIG. 2, which illustrates a configuration associated with transmitting a power to components in the electronic device 1000 of FIG. 1. The power management circuit 1900 may supply a power to the components of the electronic device 1000. The charger circuit 1910 may output a system voltage based on a power PWR received from the battery 1920 and/or any other external power source. The power management circuit 1900 may output a power to be supplied to the components of the electronic device 1000, based on the system voltage. The power management circuit 1900 may supply the components of the electronic device 1000 with a power obtained by appropriately converting the system voltage. To this end, the power management circuit 1900 may include one or more power management integrated circuits (PMICs), each PMIC may include one or more DC-DC converting circuits (e.g., 1901 and 1902), and the charger circuit 1910 may include one or more DC-DC converting circuits 1911. Each of the DC-DC converting circuits 1901, 1902, and 1911 may convert an input DC voltage to generate an output DC voltage. The output voltage may be converted from the input voltage such that a level of the output voltage is higher or lower than a level of the input voltage.

For example, each of the DC-DC converting circuits 1901, 1902, and 1911 may include a buck-boost converter. As explained more fully hereinbelow, the buck-boost converter may output an output voltage having a level that is lower than a level of an input voltage or may output an output voltage having a level that is higher than a level of an input voltage. The buck-boost converter of the present disclosure will be described in detail with reference to FIG. 3.

In some embodiments, voltages and currents output from the DC-DC converting circuits 1901 and 1902 may be transferred to at least one of the image processing block 1100, the communication block 1200, the audio processing block 1300, the buffer memory 1400, the nonvolatile memory 1500, the user interface 1600 (e.g., input/output interfaces such as a display device 1610 and a touch processing integrated circuit (IC) 1690), and the main processor 1800. The components of the electronic device 1000 may operate based on the transferred currents and voltages.

Figure 2:
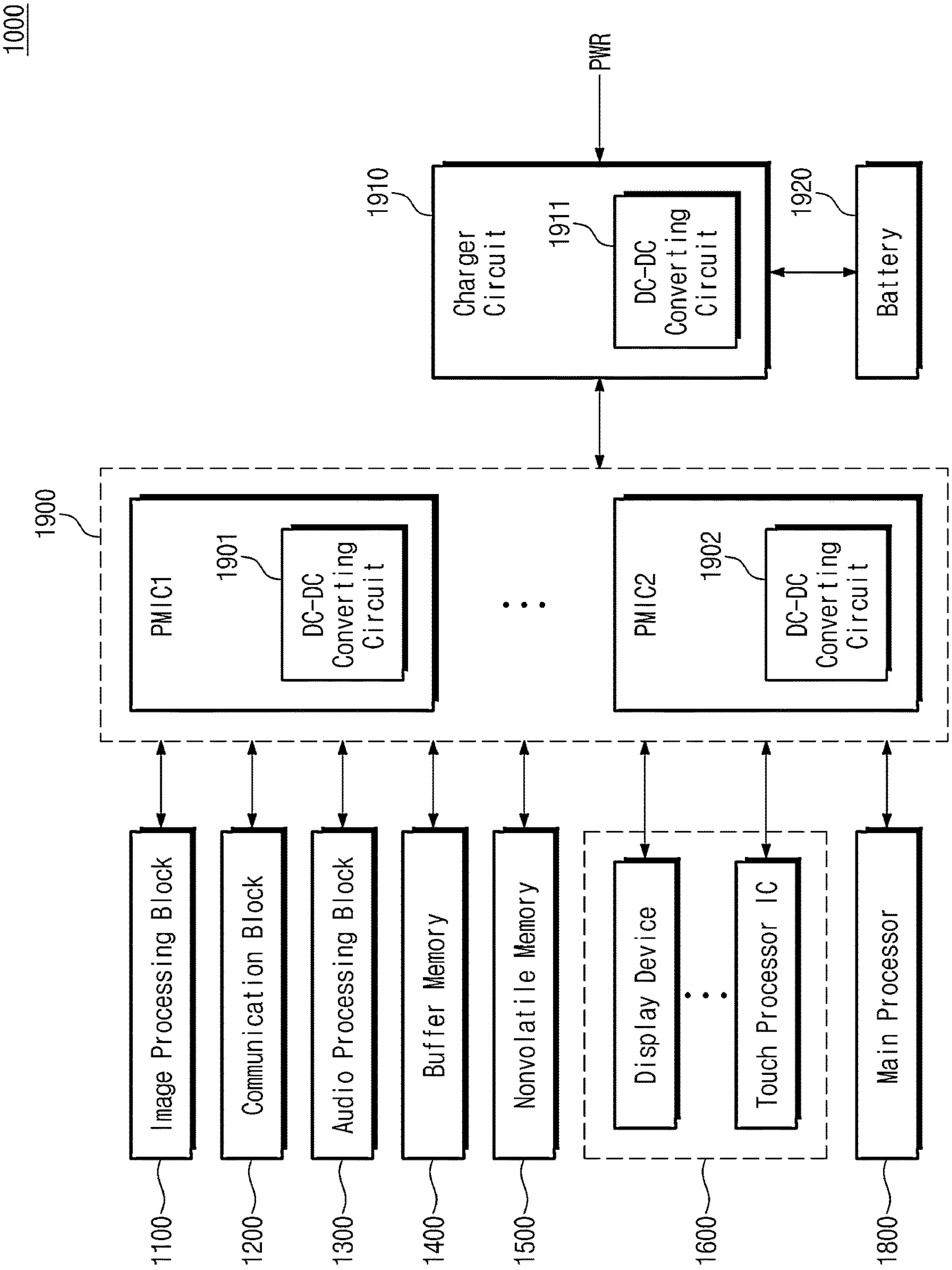
FIG. 2 is a block diagram illustrating a configuration associated with transmitting a power to components in an electronic device of FIG. 1.

The components illustrated in FIGS. 1 and 2 are provided for better understanding, and are not intended to limit the present disclosure. The electronic device 1000 may not include one or more of the components illustrated in FIGS. 1 and 2 and/or may further include at least one component not illustrated in FIGS. 1 and 2.

Below, various configurations associated with the DC-DC converting circuits 1901, 1902, and 1911 will be described. However, embodiments may be adopted for any other components of the electronic device 1000 for the purpose of converting an input voltage into an output voltage. It may be well understood that the present disclosure is not limited to anything associated with the DC-DC converting circuits 1901, 1902, and 1911.

Figure 3:
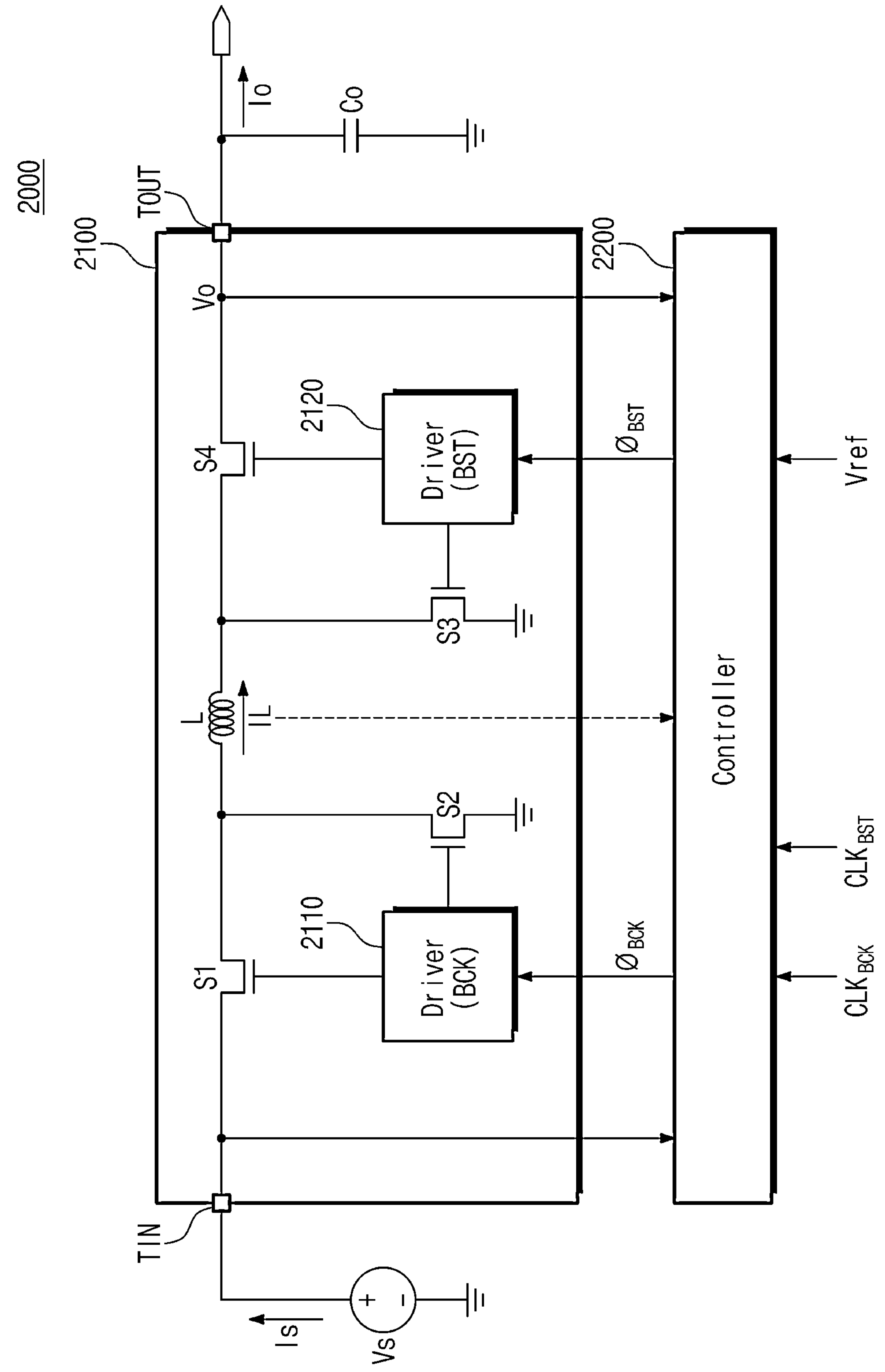
FIG. 3 is a block diagram illustrating a configuration of an electronic circuit included in the DC-DC converting circuits of FIG. 2.
Figure 4:
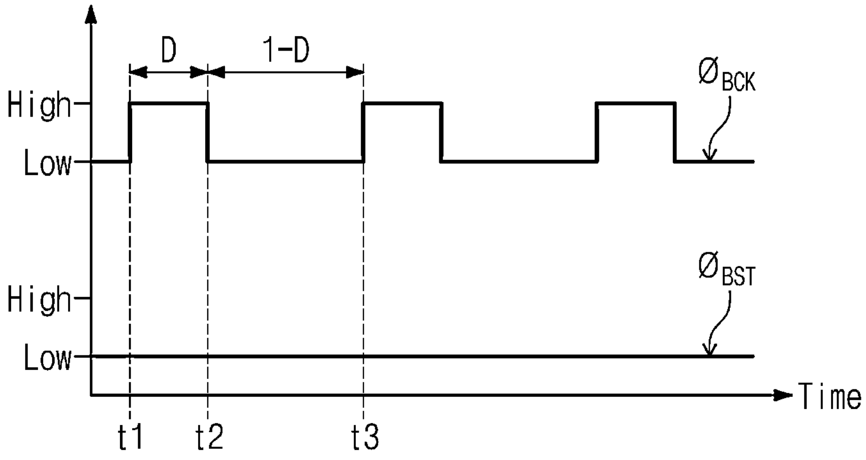
FIGS. 4 to 6 are graphs for describing how a buck-boost converter of FIG. 3 operates in a buck mode.
Figure 5:
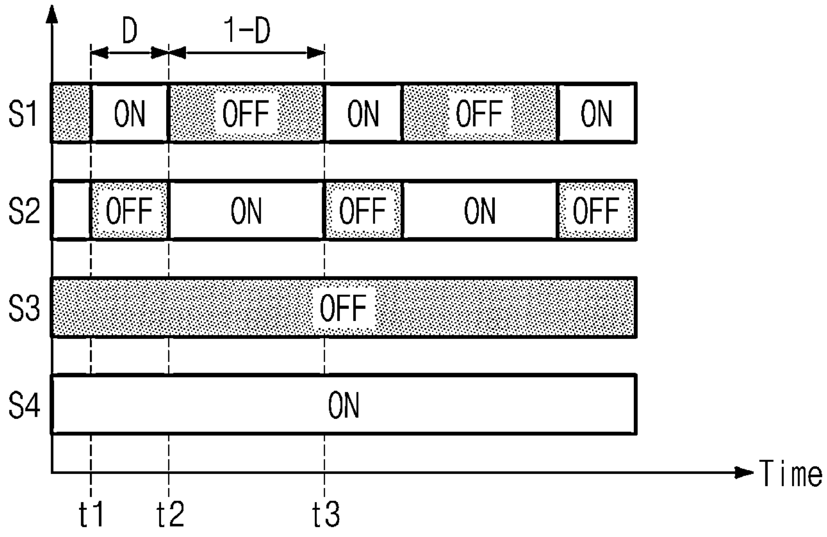
Figure 6:
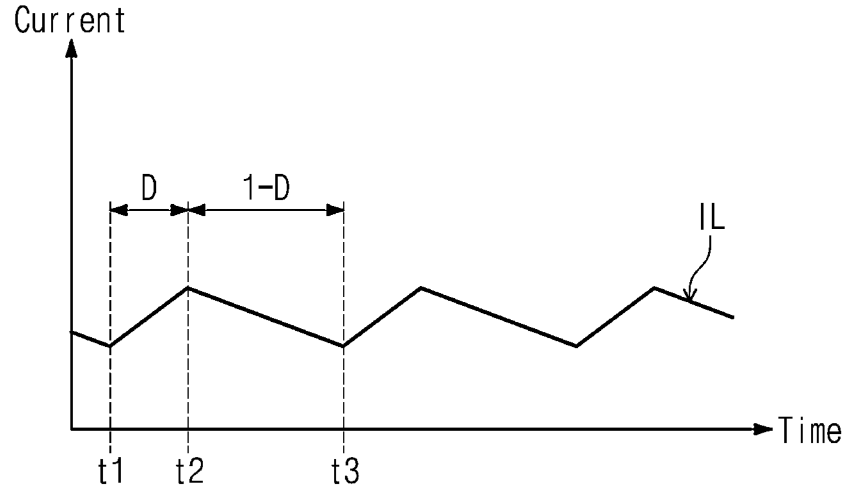
Figure 7:
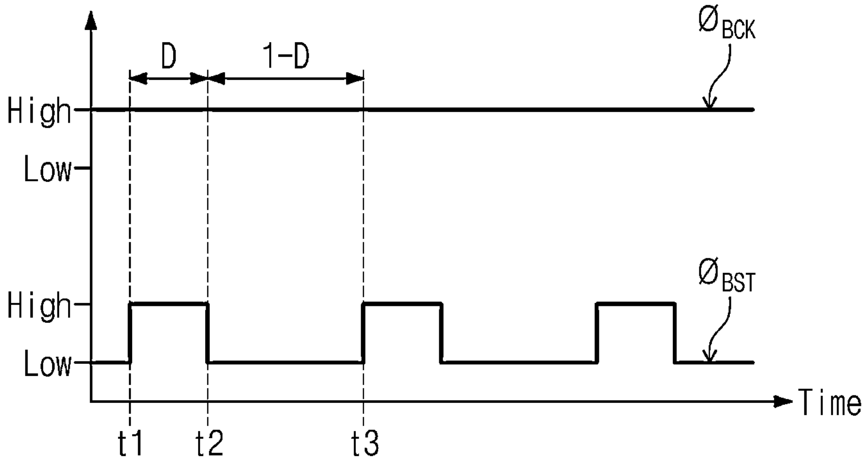
FIGS. 7 to 9 are graphs for describing how a buck-boost converter of FIG. 3 operates in a boost mode.
Figure 8:
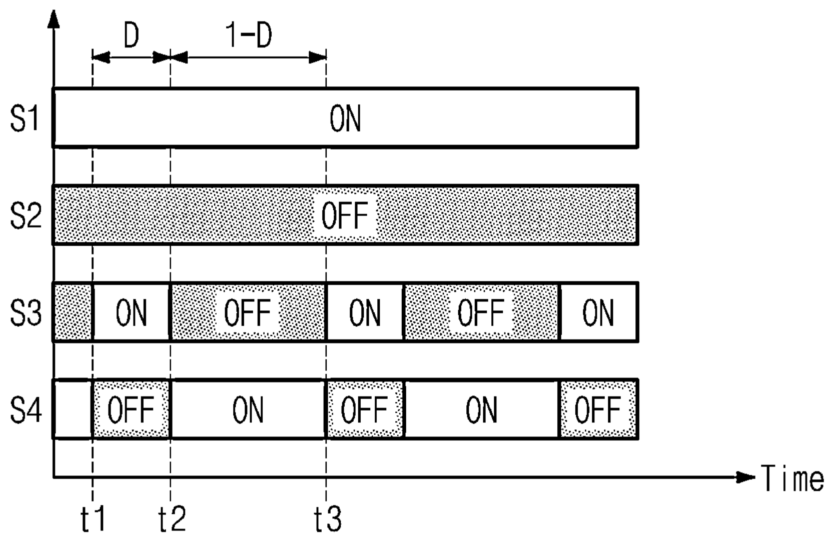
Figure 9:
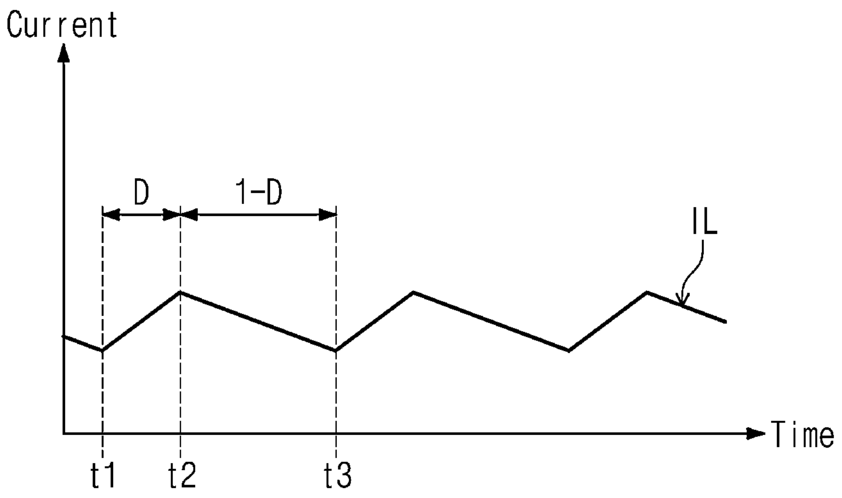
Figure 10:
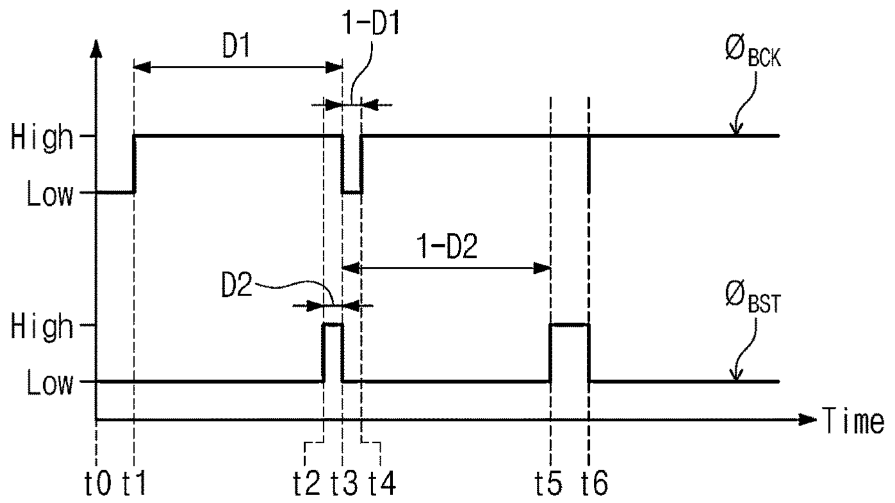
FIGS. 10 and 11 are graphs for describing how a buck-boost converter of FIG. 3 operates in a buck-boost mode.
Figure 11:
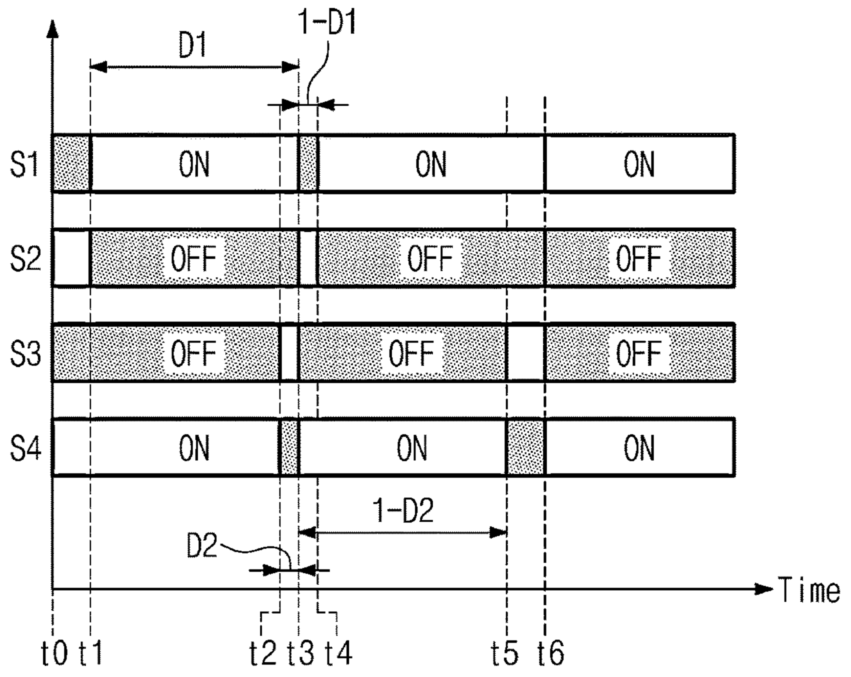

FIG. 3 is a block diagram illustrating a configuration of an electronic circuit 2000 included in the DC-DC converting circuit 1901, 1902, or 1911 of FIG. 2. FIGS. 4 to 6 are graphs for describing how a buck-boost converter 2100 of FIG. 3 operates in a buck mode; whereas FIGS. 7 to 9 are graphs for describing how the buck-boost converter 2100 of FIG. 3 operates in a boost mode. Finally, FIGS. 10 and 11 are graphs for describing how the buck-boost converter 2100 of FIG. 3 operates in a buck-boost mode. For better understanding, FIG. 3 will be described with reference to FIGS. 4 to 11.

Referring to FIG. 3, the electronic circuit 2000 may include the buck-boost converter 2100 and a controller 2200. The buck-boost converter 2100 may include drivers 2110 and 2120, switches S1, S2, S3, and S4, and an inductive element "L", which operates as an energy storage element. However, according to an alternative embodiment, the inductive element "L" may be understood as a component disposed outside the buck-boost converter 2100, not an internal component of the buck-boost converter 2100.

An input voltage Vs may be connected to an input terminal TIN of the buck-boost converter 2100. The buck-boost converter 2100 may receive an input current, which is shown as "Is", through the input terminal TIN. The input voltage Vs may correspond to the charger circuit 1910, the battery 1920, and/or any other external component.

The buck-boost converter 2100 may output the power through an output terminal TOUT. For example, an output voltage Vo and a load current Io may be output from the output terminal TOUT. The buck-boost converter 2100 may convert the input voltage Vs and the input current Is into the output voltage Vo and the load current Io. The output voltage Vo and the load current Io may be a basis of a power necessary for operations of components of the electronic device 1000.

The inductive element "L" may be an element such as an inductor or a coil. A first end of the inductive element "L" may be connected to the input terminal TIN through the first switch S1, and a second end thereof may be connected to the output terminal TOUT through the fourth switch S4. The inductive element "L" may receive the input current Is through the input terminal TIN. The inductive element "L" may generate an inductor current IL based on the input current Is and may output the inductor current IL through the output terminal TOUT.

The switches S1, S2, S3, and S4 may be implemented with an element such as a transistor or a diode. The first switch S1 may be connected between the input terminal TIN and the first end of the inductive element "L". The second switch S2 may be connected between the first end of the inductive element "L" and a ground electrode. The switches S1 and S2 may be driven by the first driver 2110 and may control a path (hereinafter, referred to as a "current path") through which a current flows. The third switch S3 may be connected between the second end of the inductive element "L" and the ground electrode. The fourth switch S4 may be connected between the second end of the inductive element "L" and the output terminal TOUT. The switches S3 and S4 may be driven by the second driver 2120 and may control a path through which a current flows.

In an embodiment, the switches S1 to S4 may be implemented with an NMOS (N-channel Metal Oxide Semiconductor) transistor. However, this is provided as an example, and the present disclosure is not limited thereto. A kind and a type of each of the switches S1 to S4 may be variously changed or modified to establish a current path under control of the drivers 2110 and 2120.

In an embodiment, the current path for the inductor current IL may be provided depending on on/off states of the switches S1 to S4, which are capable of being variously combined. For example, when the third switch is turned off, the fourth switch S4 is turned-on, and turn-on and turn-off states of the switches S1 and S2 are repeated, the electronic circuit 2000 may operate in the buck mode. For example, when the first switch S1 is turned on, the second switch S2 is turned off, and turn-on and turn-off states of the switches S3 and S4 are repeated, the electronic circuit 2000 may operate in the boost mode.

The controller 2200 may be connected to the input terminal TIN and the output terminal TOUT. The controller 2200 may generate gate control signals $Ø_{BCK}$ and $Ø_{BST}$ for controlling the drivers 2110 and 2120 based on the input voltage Vs and the output voltage Vo. For example, based on the input voltage Vs and the output voltage Vo, the controller 2200 may generate a first pulse with the duty ratio of Vo/Vs and a second pulse with the duty ratio of (1-Vs/Vo). The controller 2200 may control a reset time of a ramp signal RAMP based on the first pulse and/or the second pulse. The controller 2200 may generate the gate control signals $Ø_{BCK}$ and $Ø_{BST}$ based on the ramp signal RAMP, a reference voltage Vref, a first clock $CLK_{BCK}$, a second clock $CLK_{BST}$, etc.

The first driver 2110 may generate signals for controlling the switches S1 and S2 based on the first gate control signal $Ø_{BCK}$. To this end, the first driver 2110 may include at least one PMOS transistor and/or at least one NMOS transistor. The second driver 2120 may generate signals for controlling the switches S3 and S4 based on the second gate control signal $Ø_{BST}$. To this end, the second driver 2120 may include at least one PMOS transistor and/or at least one NMOS transistor.

A capacitive element $C_o$ may buffer a voltage of the output terminal TOUT. In addition, while the switch S4 is turned off, the output voltage Vo and the load current Io may be provided based on charges stored in the capacitive element $C_o$. In an embodiment, the buck-boost converter 2100 may operate in the buck mode, the boost mode, or the buck-boost mode depending on the level of the input voltage Vs and the level of the output voltage Vo. For example, when the level of the input voltage Vs is higher than the level of the output voltage Vo, the buck-boost converter 2100 may operate in the buck mode. In contrast, when the level of the input voltage Vs is lower than the level of the output voltage Vo, the buck-boost converter 2100 may operate in the boost mode. In a specific time interval including a time point where the level of the input voltage Vs is identical to the level of the output voltage Vo, the buck-boost converter 2100 may operate in the buck-boost mode.

In general, to reduce the ripple that the magnitude of the output voltage Vo changes depending on a magnitude change of the input voltage Vs, there is used a method of generating a ramp signal of which slope interworks with the input voltage Vs. However, according to the present disclosure, the ripple of the output voltage Vo may be reduced by generating a pulse having a duty cycle that is based on the input voltage Vs and the output voltage Vo and controlling the reset timing of the ramp signal depending on the generated pulse.

Referring to FIG. 4, while the buck-boost converter 2100 operates in the buck mode, the first gate control signal $Ø_{BCK}$ may alternately have a level corresponding to logic high and a level corresponding to logic low. For example, the first gate control signal $Ø_{BCK}$ may have the level corresponding to logic high in a time interval from t1 to t2 and may have the level corresponding to logic low in a time interval from t2 to t3. While the buck-boost converter 2100 operates in the buck mode, the second gate control signal $Ø_{BST}$ may have the level corresponding to logic low.

The level of the first gate control signal $Ø_{BCK}$ may periodically change. For example, a time interval from t1 to t3 may correspond to one period. The first gate control signal $Ø_{BCK}$ may have the level corresponding to logic high and the level corresponding to logic low during one period. For example, the logic high of first gate control signal $Ø_{BCK}$ may be maintained during duration D, and the logic low of the first gate control signal $Ø_{BCK}$ may be maintained during duration (1-D). That is, the duty ratio of the first gate control signal $Ø_{BCK}$ may be "D". Herein, "D" may be a real number between 0 and 1.

Referring to FIG. 5, in the buck mode of the buck-boost converter 2100, the first switch S1 and the second switch S2 may operate exclusively. That is, when the first switch S1 is turned on, the second switch S2 is turned off, but when the first switch S1 is turned off, the second switch S2 is turned on. In the buck mode of the buck-boost converter 2100, the third switch S3 may be turned off, and the fourth switch S4 may be turned on. In an embodiment, the first driver 2110 may generate control signals for controlling the first switch S1 and the second switch S2 based on the first gate control signal $Ø_{BCK}$, and the second driver 2120 may generate control signals for controlling the third switch S3 and the fourth switch S4 based on the second gate control signal $Ø_{BST}$.

Referring to FIG. 6, as the turn-on and turn-off states of the switches S1 and S2 are repeated depending on the duty ratio of the first gate control signal $Ø_{BCK}$, the intensity of the inductor current IL may repeatedly increase and decrease. For example, in the time interval from t1 to t2, the first switch S1 may be turned on, and the second switch S2 may be turned off; in this case, the intensity of the inductor current IL may increase. In the time interval from t2 to t3, the first switch S1 may be turned off, and the second switch S2 may be turned on; in this case, the intensity of the inductor current IL may decrease. As the inductor current IL is transferred to the output terminal TOUT, the load current Io may be output from the buck-boost converter 2100.

Referring to FIG. 7, while the buck-boost converter 2100 operates in the boost mode, the first gate control signal $Ø_{BCK}$ may have the level corresponding to logic high, and the second gate control signal $Ø_{BST}$ may alternately have the level corresponding to logic high and the level corresponding to logic low during one period. For example, the second gate control signal $Ø_{BST}$ may have the level corresponding to logic high in the time interval from t1 to t2 and may have the level corresponding to logic low in the time interval from t2 to t3. The duty ratio of the second gate control signal $Ø_{BST}$ may be "D".

Referring to FIG. 8, in the boost mode of the buck-boost converter 2100, the first switch S1 may be turned on, and the second switch S2 may be turned off. The third switch S3 and the fourth switch S4 may operate exclusively. That is, when the third switch S3 is turned off, the fourth switch S4 is turned on; when the third switch S3 is turned on, the fourth switch S4 is turned off. In an embodiment, the first driver 2110 may generate control signals for controlling the first switch S1 and the second switch S2 based on the first gate control signal $Ø_{BCK}$, and the second driver 2120 may generate control signals for controlling the third switch S3 and the fourth switch S4 based on the second gate control signal $Ø_{BST}$.

Referring to FIG. 9, as the turn-on and turn-off states of the switches S3 and S4 are repeated depending on the duty ratio of the second gate control signal $Ø_{BST}$, the intensity of the inductor current IL may repeatedly increase and increase. For example, in the time interval from t1 to t2, the third switch S3 may be turned on, and the fourth switch S4 may be turned off, so that in this case, the intensity of the inductor current IL may increase. In the time interval from t2 to t3, the third switch S3 may be turned off, and the fourth switch S4 may be turned on, so that in this case, the intensity of the inductor current IL may decrease. As the inductor current IL is transferred to the output terminal TOUT, the load current Io may be output from the buck-boost converter 2100.

Referring to FIG. 10, the buck-boost mode may mean a mode in which a characteristic of the buck mode and a characteristic of the boost mode exist together. For example, the buck-boost mode may mean a specific zone where the buck-boost converter 2100 switches from the buck mode to the boost mode or switches from the boost mode to the buck mode.

Advantageously, while the buck-boost converter 2100 operates in the buck-boost mode, the first gate control signal $Ø_{BCK}$ may alternately have the level corresponding to logic high and the level corresponding to logic low. The first gate control signal $Ø_{BCK}$ may have the level corresponding to logic high in a time interval (i.e., D1) from t1 to t3 and may have the level corresponding to logic low in a time interval (i.e., 1-D1) from t3 to t4. Next, the first gate control signal $Ø_{BCK}$ may have the level corresponding to logic high in a time interval from t4 to t6 and may have the level corresponding to logic low in a moment at a point in time t6.

Moreover, while the buck-boost converter 2100 operates in the buck-boost mode, the second gate control signal $Ø_{BST}$ may alternately have the level corresponding to logic low and the level corresponding to logic high. For example, the second gate control signal $Ø_{BST}$ may have the level corresponding to logic high in a moment at a point in time to and may have the level corresponding to logic low in a time interval from t0 to t2. The second gate control signal $Ø_{BST}$ may have the level corresponding to logic high in a time interval (i.e., D2) from t2 and the t3 and may have the level corresponding to logic low in a time interval (i.e., 1-D2) from t3 to t5. Next, the second gate control signal $Ø_{BST}$ may have the level corresponding to logic high in a time interval from t5 to t6.

Referring to FIG. 11, in the buck-boost mode of the buck-boost converter 2100, the first switch S1 may be repeatedly turned on and turned off until the point in time t6. The first switch S1 may be turned off in a moment at the point in time t6 and may be continuously turned on in a time interval following the point in time t6. The second switch S2 may be repeatedly turned off and turned on until the point in time t6. The second switch S2 may be turned on in a moment at the point in time t6 and may be continuously turned off in a time interval following the point in time t6. That is, in the time interval following the point in time t6, the buck-boost converter 2100 may operate in the boost mode, and the waveforms of the switches S1 and S2 may be the same as the waveforms of the switches S1 and S2 of FIG. 8.

In the buck-boost mode of the buck-boost converter 2100, the third switch S3 may be turned off in a time period preceding the point in time to and may be turned on in a moment at the point in time to. In a time interval following the point in time to, the third switch S3 may be repeatedly turned off and turned on. The fourth switch S4 may be turned on in a time interval preceding the point in time to and may be turned off in a moment at the point in time to. In a time interval following the point in time to, the fourth switch S4 may be repeatedly turned on and turned off. That is, in the time interval following the point in time to, the buck-boost converter 2100 may operate in the buck mode, and the waveforms of the switches S3 and S4 may be the same as the waveforms of the switches S3 and S4 of FIG. 5.

Figure 12:
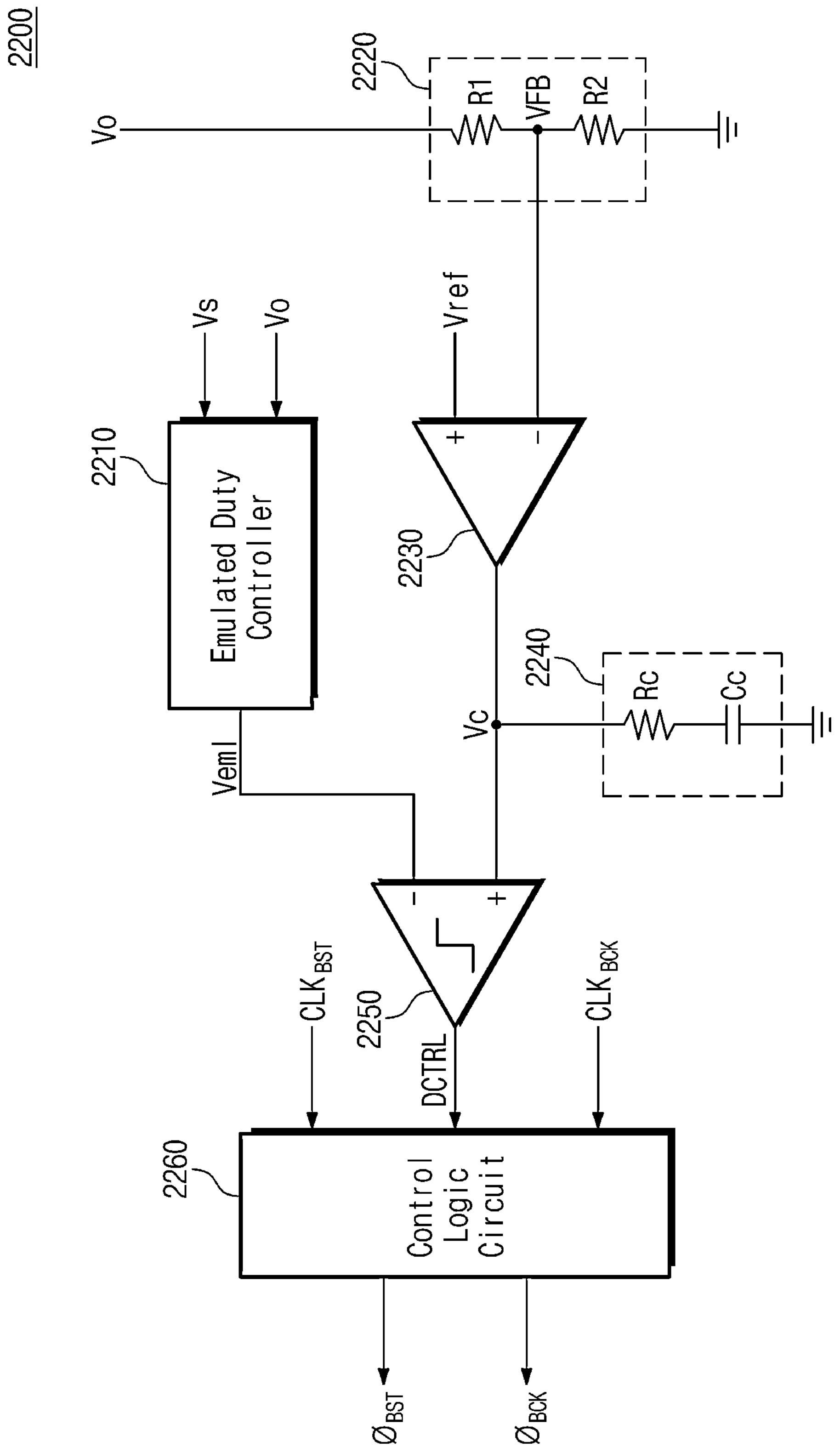
FIG. 12 is a diagram illustrating a configuration of controller of FIG. 3.
Figure 13:
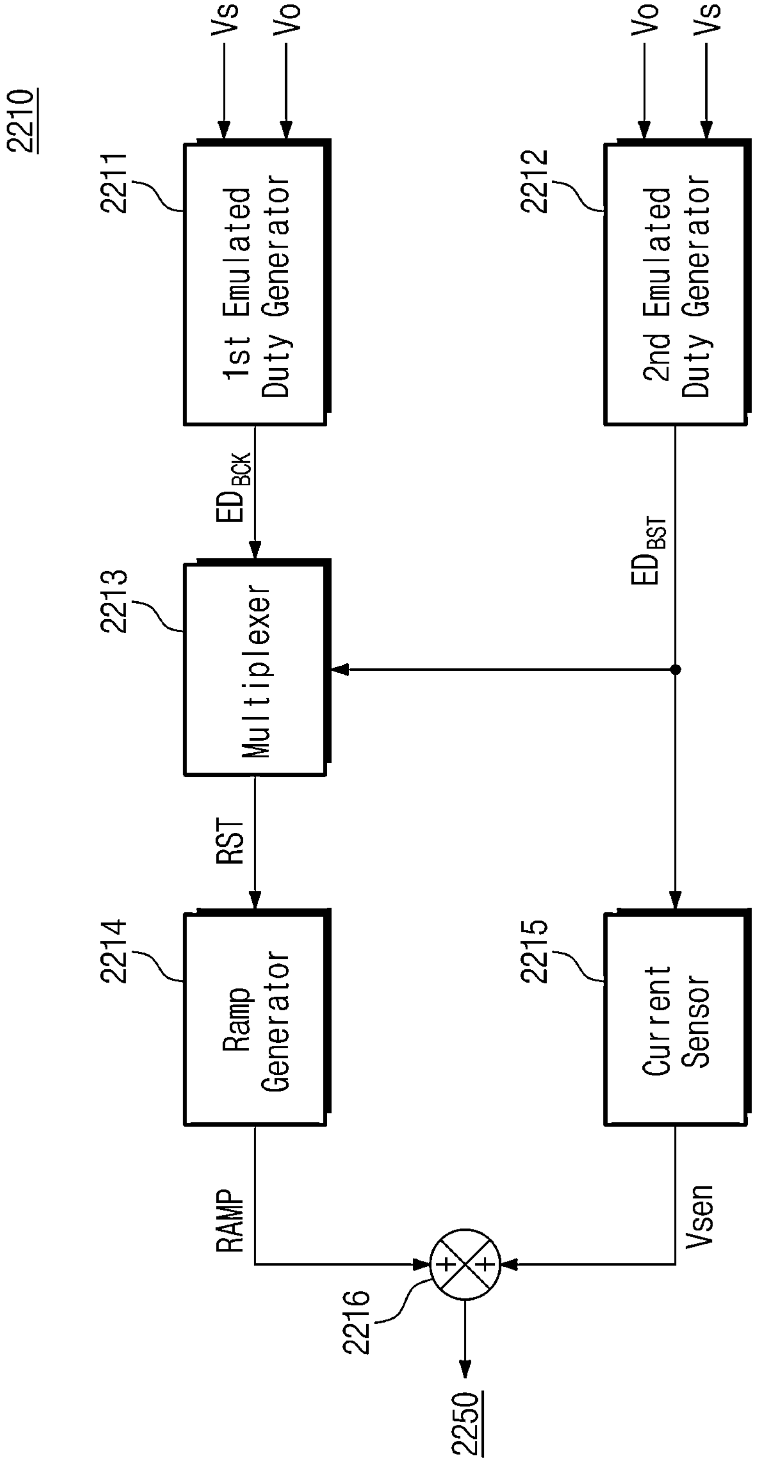
FIG. 13 illustrates a configuration of an emulated duty controller of FIG. 12.

FIG. 12 illustrates a configuration of the controller 2200 of FIG. 3. FIG. 13 illustrates a configuration of an emulated duty controller 2210 of FIG. 12. For better understanding, FIG. 12 will be described with reference to FIG. 13. As shown, the controller 2200 may include the emulated duty controller 2210, a feedback circuit 2220, an amplifier 2230, a compensation circuit 2240, a comparator 2250, and a control logic circuit 2260. The emulated duty controller 2210 may generate a pulse with the duty ratio of Vo/Vs and a pulse with the duty ratio of (1-Vs/Vo) based on the input voltage Vs and the output voltage Vo. The emulated duty controller 2210 may control (e.g., may delay) the timing to reset the ramp signal RAMP based on the generated pulses. The emulated duty controller 2210 may be configured to generate a signal for compensating for a change in the output voltage Vo according to a change in the input voltage Vs, based on the delayed ramp signal RAMP. In an embodiment, the emulated duty controller 2210 may include a first emulated duty generator 2211, a second emulated duty generator 2212, a multiplexer 2213, a ramp generator 2214, a current sensor 2215, and an adder 2216.

The first emulated duty generator 2211 may receive the input voltage Vs and the output voltage Vo and may generate a first pulse $ED_{BCK}$ with the duty ratio of Vo/Vs. When the level of the input voltage Vs decreases, the duty ratio of the first pulse $ED_{BCK}$ may increase. The first pulse $ED_{BCK}$ may be used to delay a reset signal RST in the buck mode of the buck-boost converter 2100. The second emulated duty generator 2212 may receive the input voltage Vs and the output voltage Vo and may generate a second pulse $ED_{BST}$ with the duty ratio of (1-Vs/Vo). The second pulse $ED_{BST}$ may be used to delay the reset signal RST in the boost mode of the buck-boost converter 2100.

In an embodiment, in the buck mode of the buck-boost converter 2100, the duty ratio of the first pulse $ED_{BCK}$ may be greater than "0". In contrast, because a value of the input voltage Vs is greater than a value of the output voltage Vo, the duty ratio of the second pulse $ED_{BST}$ may be "0". In an embodiment, in the boost mode of the buck-boost converter 2100, because a magnitude of the input voltage Vs is smaller than a magnitude of the output voltage Vo, the duty ratio of the first pulse $ED_{BCK}$ may be "1". In contrast, the duty ratio of the second pulse $ED_{BST}$ may be greater than "0".

The multiplexer 2213 may add the first pulse $ED_{BCK}$ and the second pulse $ED_{BST}$. The multiplexer 2213 may generate the reset signal RST that is activated at a falling edge of a pulse obtained by adding the first pulse $ED_{BCK}$ and the second pulse $ED_{BST}$. The multiplexer 2213 may output the reset signal RST to the ramp generator 2214. In another embodiment, the multiplexer 2213 may add the first pulse $ED_{BCK}$ and the second pulse $ED_{BST}$ and may output the pulse obtained by adding the first pulse $ED_{BCK}$ and the second pulse $ED_{BST}$ to the ramp generator 2214. In this case, the ramp generator 2214 may be configured to reset the ramp signal RAMP at the falling edge of the pulse obtained by adding the first pulse $ED_{BCK}$ and the second pulse $ED_{BST}$.

The ramp generator 2214 may generate the ramp signal RAMP that is reset to "0" in response to the reset signal RST. When the intensity of the input voltage Vs decreases, because the duty ratio of the first pulse $ED_{BCK}$ or the duty ratio of the second pulse $ED_{BST}$ increases, the timing to be reset by the ramp generator 2214 may be delayed. The ramp generator 2214 may output the ramp signal RAMP with the delayed reset timing.

The current sensor 2215 may sense the intensity of the inductor current IL flowing through the inductive element "L" (refer to FIG. 3) and may output a sensing voltage Vsen corresponding to the sensed intensity of the inductor current IL. The current sensor 2215 may operate in the boost mode of the buck-boost converter 2100. A level of the sensing voltage Vsen may increase or decrease along a value of the second pulse $ED_{BST}$. The adder 2216 may add the ramp signal RAMP and the sensing voltage Vsen. The adder 2216 may output the added value as an emulated voltage Veml to a second input terminal (e.g., a negative/inverting input terminal) of the comparator 2250. The feedback circuit 2220 may generate a feedback voltage VFB based on the output voltage Vo from the buck-boost converter 2100. For example, the feedback circuit 2220 may be composed of a resistor R1 and a resistor R2 and may be implemented to have a voltage division function. However, the configuration of the feedback circuit 2220 is not limited thereto. For example, the feedback circuit 2220 may be implemented with various configurations for outputting the feedback voltage VFB to which the change in the output voltage Vo is applied. The amplifier 2230 may amplify a difference between the reference voltage Vref and the feedback voltage VFB to output a compensation voltage Vc. The amplifier 2230 may output the compensation voltage Vc to a first input terminal (e.g., a positive/non-inverting input terminal) of the comparator 2250.

The compensation circuit 2240 may stabilize the compensation voltage Vc. For example, the compensation circuit 2240 may include a compensation resistor Rc and a compensation capacitor Cc connected in series. However, the configuration of the compensation circuit 2240 is not limited thereto. For example, the compensation circuit 2240 may include at least one resistor and/or at least one capacitor implemented in various manners to stabilize the compensation voltage Vc. The comparator 2250 may receive the emulated voltage Veml and the compensation voltage Vc. The comparator 2250 may compare the emulated voltage Veml and the compensation voltage Vc and may output a control signal DCTRL to the control logic circuit 2260 as a compensation result. The control signal DCTRL may be a signal that has logic high in a time interval where a value of the compensation voltage Vc is greater than a value of the emulated voltage Veml.

The control logic circuit 2260 may generate the first gate control signal $Ø_{BCK}$ and the second gate control signal $Ø_{BST}$ based on the control signal DCTRL, the first clock $CLK_{BCK}$, and the second clock $CLK_{BST}$. The first gate control signal $Ø_{BCK}$ may transition to logic high in response to the input of the first clock $CLK_{BCK}$ (i.e., the rising edge of the first clock $CLK_{BCK}$) and may transition to logic low in response to the falling edge of the control signal DCTRL. The second gate control signal $Ø_{BST}$ may transition to logic high in response to the input of the second clock $CLK_{BST}$ (i.e., the rising edge of the second clock $CLK_{BST}$) and may transition to logic low in response to the falling edge of the control signal DCTRL.

In general, when the intensity of the input voltage Vs changes, the intensity of the output voltage Vo changes. In this case, the level of the compensation voltage Vc should be changed such that the duty ratio of the control signal DCTRL changes and the ripple of the output voltage Vo decreases, that is, such that the output voltage Vo is stabilized. However, the above manner may cause the issue that the intensity of the compensation voltage Vc should be changed.

In addition, according to an embodiment of the present disclosure, the emulated duty controller 2210 may increase the duty ratio of the first gate control signal $Ø_{BCK}$ and/or the second gate control signal $Ø_{BST}$ by using the delayed ramp signal RAMP even without the change in the intensity of the compensation voltage Vc. As a result, it may be possible to compensate for the compensation voltage Vc that should be changed due to the change in the intensity of the input voltage Vs. That is, the compensation voltage Vc may be uniformly maintained. In other words, even though the input voltage Vs changes, the output voltage Vo may be effectively stabilized without the change in the compensation voltage Vc in a time interval where the operation mode of the buck-boost converter 2100 changes.

Figure 14:
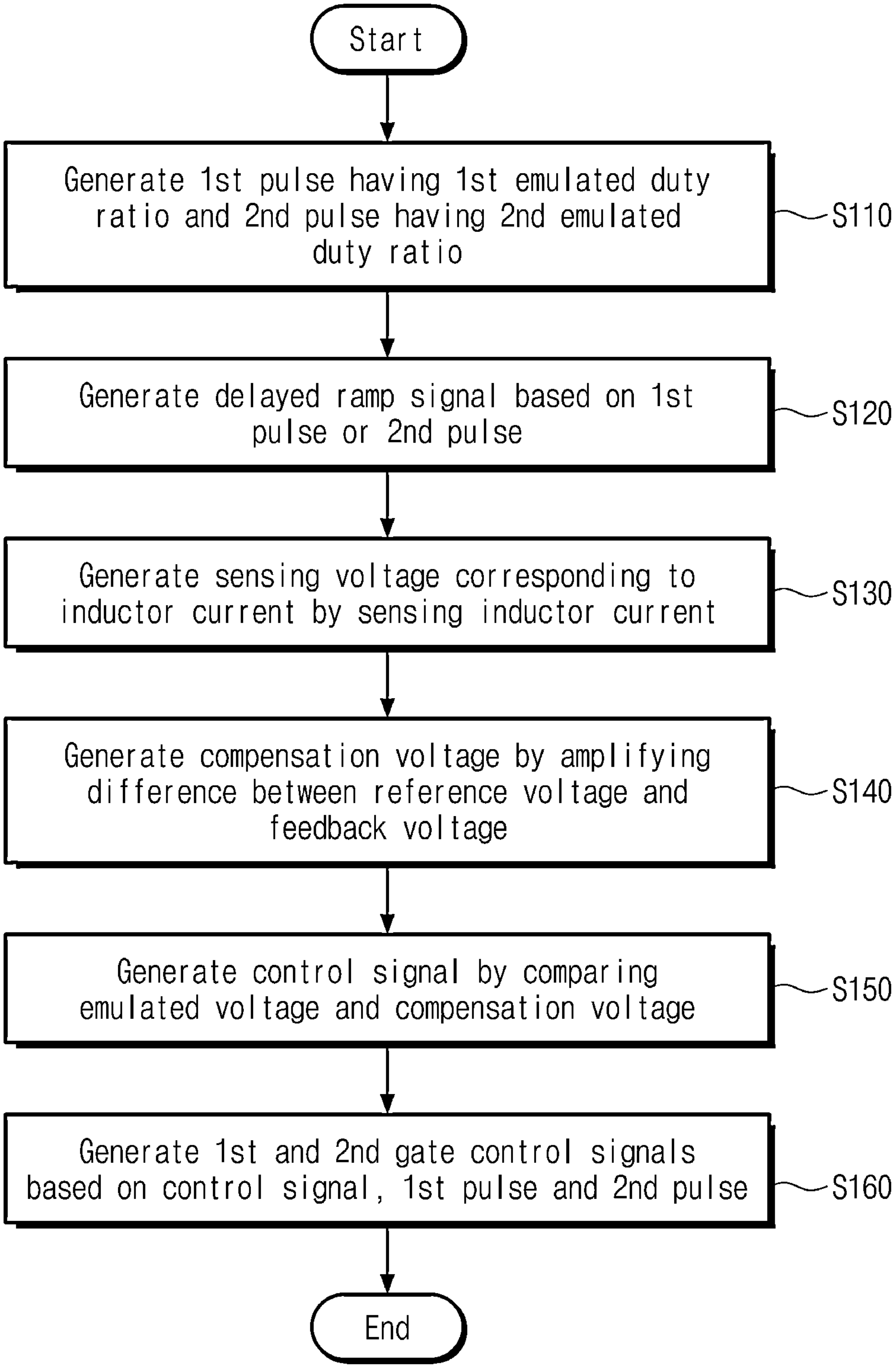
FIG. 14 is a flowchart illustrating an operating method of an electronic circuit according to an embodiment of the present disclosure.

FIG. 14 is a flowchart illustrating an operating method of the electronic circuit 2000 (refer to FIG. 3) according to an embodiment of the present disclosure. For better understanding, FIG. 14 will be described together with reference to FIGS. 3, 12, and 13. In operation S110, the emulated duty controller 2210 may generate the first pulse $ED_{BCK}$ with the first emulated duty ratio (i.e., Vo/Vs) based on the input voltage Vs and the output voltage Vo. Also, the emulated duty controller 2210 may generate the second pulse $ED_{BST}$ with the second emulated duty ratio (i.e., 1-Vs/Vo) based on the input voltage Vs and the output voltage Vo.

In operation S120, the emulated duty controller 2210 may generate the ramp signal RAMP that is reset by the first pulse $ED_{BCK}$ and/or the second pulse $ED_{BST}$. Herein, the ramp signal RAMP may be a ramp signal delayed with respect to an original ramp signal depending on the change in the intensity of the input voltage Vs. In operation S130, the emulated duty controller 2210 may sense the inductor current IL based on the second pulse $ED_{BST}$ and may generate the sensing voltage Vsen corresponding to the sensed inductor current. In operation S140, the amplifier 2230 may generate the compensation voltage Vc by amplifying a difference between the reference voltage Vref and the feedback voltage VFB. In operation S150, the comparator 2250 may compare the emulated voltage Veml and the compensation voltage Vc and may output the control signal DCTRL as a compensation result. In general, the compensation voltage Vc should be changed to stabilize the output voltage Vo changing together when the intensity of the input voltage Vs changes. However, according to the present disclosure, the intensity of the compensation voltage Vc to be changed may be compensated by the first pulse $ED_{BCK}$ or the second pulse $ED_{BST}$ having the increased duty ratio. Accordingly, there may be no need to change the intensity of the compensation voltage Vc separately. In operation S160, the control logic circuit 2260 may generate the first gate control signal $Ø_{BCK}$ and the second gate control signal $Ø_{BST}$ based on the control signal DCTRL, the first clock $CLK_{BCK}$, and the second clock $CLK_{BST}$. The first gate control signal $Ø_{BCK}$ and the second gate control signal $Ø_{BST}$ may be respectively input to the first driver 2110 and the second driver 2120 and may be used to control the operation mode of the buck-boost converter 2100.

Figure 15:
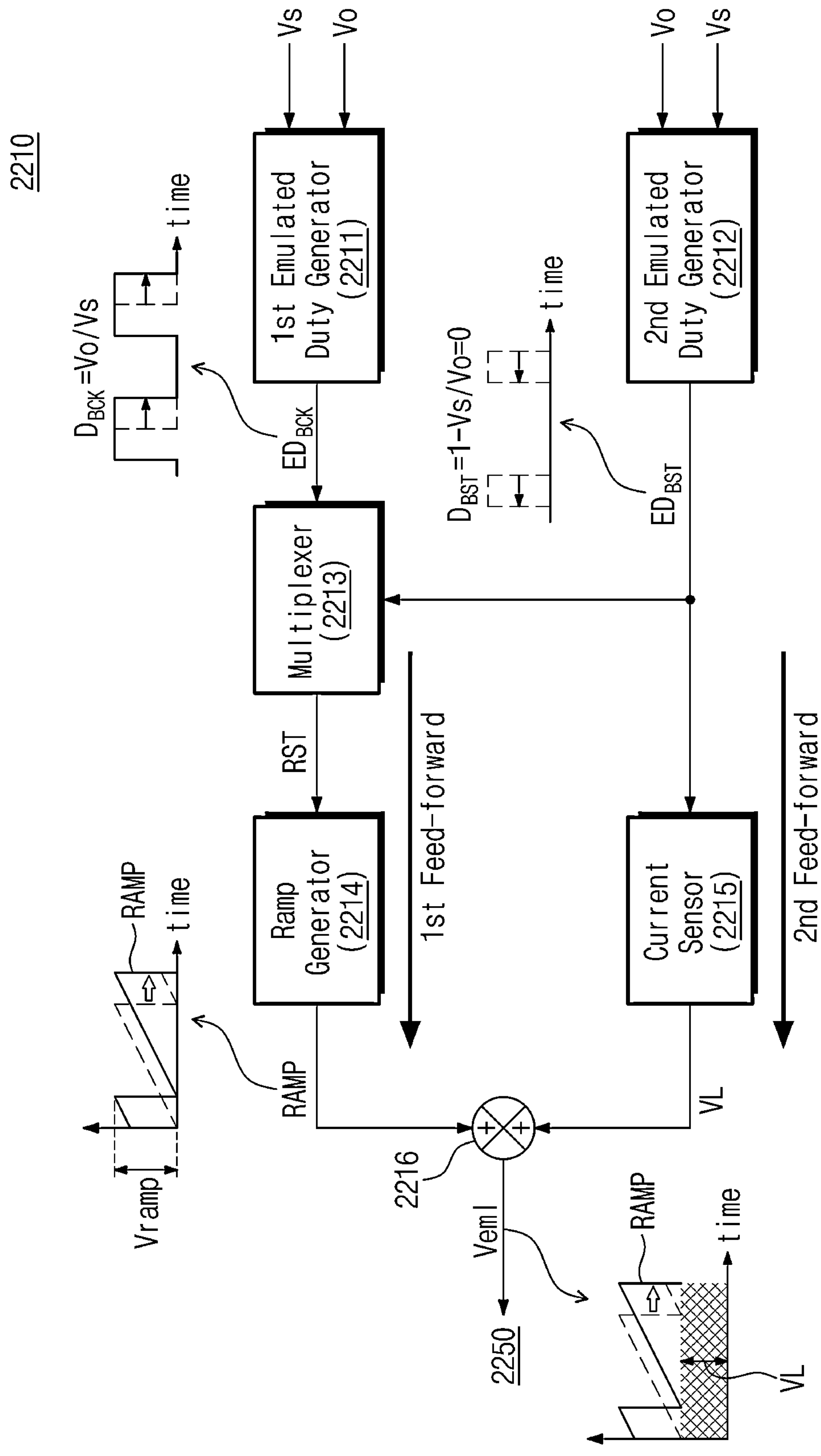
FIG. 15 illustrates how an emulated duty controller of FIG. 12 operates in a buck mode.

FIG. 15 illustrates how the emulated duty controller 2210 of FIG. 12 operates in a buck mode. In the buck mode of the buck-boost converter 2100 (refer to FIG. 3), the first emulated duty generator 2211 may generate the first pulse $ED_{BCK}$ with a duty ratio $D_{BCK}$ of Vo/Vs based on the input voltage Vs and the output voltage Vo. When the intensity of the input voltage Vs decreases, the duty ratio may increase. The second emulated duty generator 2212 may generate the second pulse $ED_{BST}$ with a duty ratio $D_{BST}$ of (1-Vs/Vo). In the buck mode, because the magnitude of the input voltage Vs is greater than the magnitude of the output voltage Vo and the duty ratio has a value between 0 and 1, the duty ratio $D_{BST}$ of the second pulse $ED_{BST}$ output from the second emulated duty generator 2212 may be "0".

The multiplexer 2213 may add the first pulse $ED_{BCK}$ output from the first emulated duty generator 2211 and the second pulse $ED_{BST}$ output from the second emulated duty generator 2212. The multiplexer 2213 may output a pulse obtained by adding the first pulse $ED_{BCK}$ and the second pulse $ED_{BST}$ to the ramp generator 2214 as the reset signal RST.

The ramp generator 2214 may generate the ramp signal RAMP that is reset at the falling edge of the reset signal RST. When the magnitude of the input voltage Vs decreases, because the duty ratio of the first pulse $ED_{BCK}$ increases (i.e., the timing of the falling edge is delayed), the timing to reset the ramp signal RAMP may also be delayed. As described above, that the change in the input voltage Vs delays the reset timing of the ramp signal RAMP may correspond to first feed-forward compensation.

The current sensor 2215 may sense the inductor current IL flowing through the inductive element "L" (refer to FIG. 3) and may output a voltage VL corresponding to the inductor current IL as the sensing voltage Vsen. That the change in the input voltage Vs is applied to the voltage VL may correspond to second feed-forward compensation. A configuration and an operation of the current sensor 2215 will be described in detail with reference to FIG. 16.

The adder 2216 may add the ramp signal RAMP output from the ramp generator 2214 and the voltage VL output from the current sensor 2215 and may output the added value as the emulated voltage Veml. The emulated voltage Veml may be a ramp signal that has a minimum value of VL and a maximum value of (Vramp+VL) as illustrated in FIG. 15. The adder 2216 may output the emulated voltage Veml to the comparator 2250.

Figure 16:
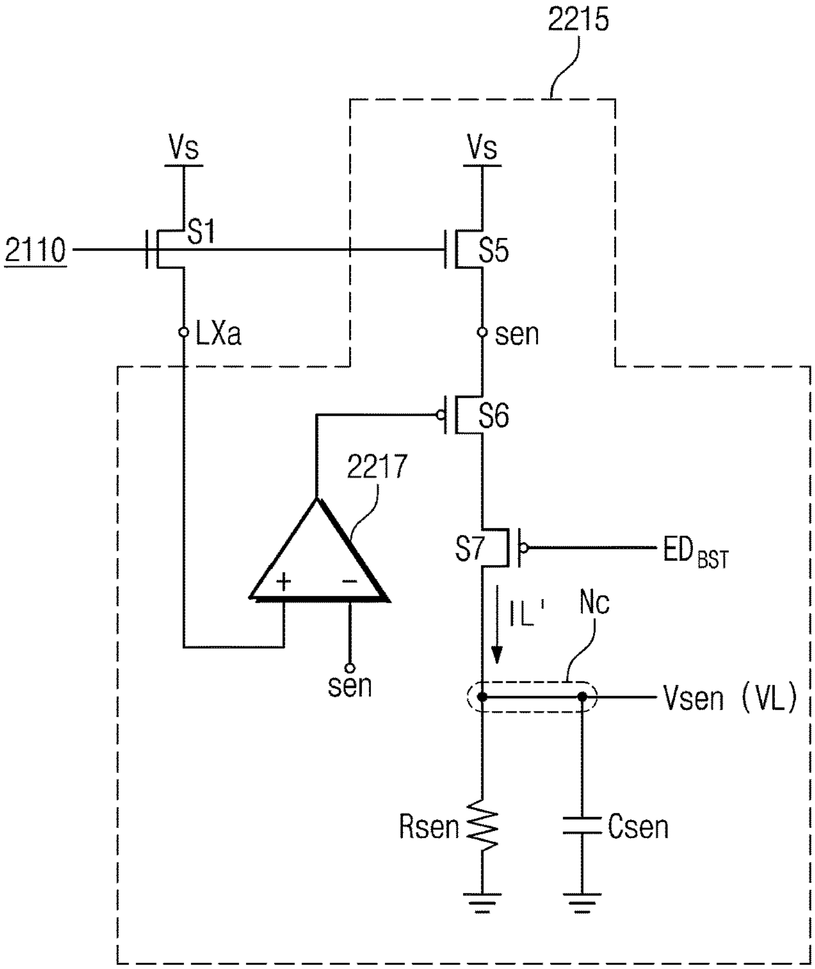
FIG. 16 illustrates a configuration of a current sensor of FIG. 15.
Figure 17:
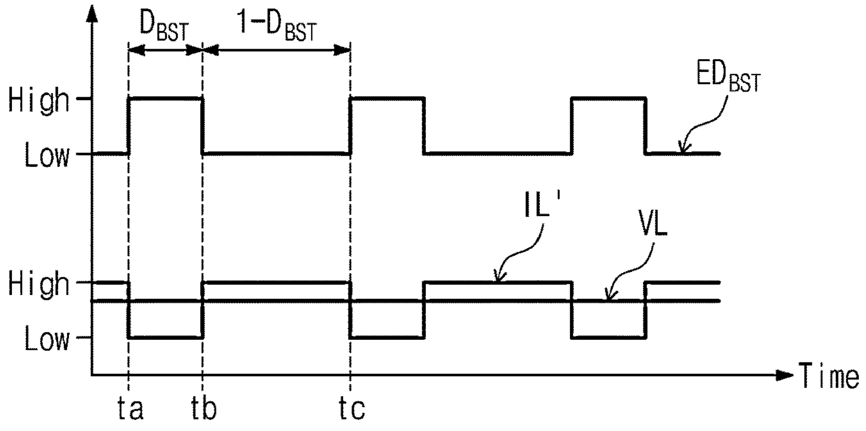
FIG. 17 illustrates a waveform of a replica current.

FIG. 16 illustrates a configuration of a current sensor of FIG. 15. FIG. 17 illustrates a waveform of a replica current IL'. For better understanding, FIG. 16 will be described together with reference to FIG. 17. The current sensor 2215 may be configured to replicate the inductor current IL flowing through the inductive element "L" (refer to FIG. 3). The current sensor 2215 may be connected to a node LXa. The node LXa may be a node between the first switch S1 and the inductive element "L" (refer to FIG. 3). For example, the current sensor 2215 may include an amplifier 2217, a fifth switch S5, a sixth switch S6, a seventh switch S7, a sensing resistor Rsen, and a sensing capacitor Csen.

A first input terminal (i.e., a positive input terminal) of the amplifier 2217 may be connected to the node LXa, and a second input terminal (i.e., a negative input terminal) thereof may be connected to a sensing node SEN. The amplifier 2217 may amplify a voltage difference of the node LXa and the sensing node SEN. The amplifier 2217 may output the amplified voltage difference to a gate electrode of the sixth switch S6.

The fifth switch S5 may output the input voltage Vs in response to an output voltage of the first driver 2110. For example, the fifth switch S5 may be implemented with an NMOS transistor. A first end of the fifth switch S5 may be connected to a node to which the input voltage Vs is provided, and a second end thereof may be connected to the sensing node sen. The gate electrode of the fifth switch S5 may be connected to the first driver 2110.

The sixth switch S6 may output a voltage of the sensing node SEN in response to a voltage output from the amplifier 2217. That is, a first end of the sixth switch S6 may be connected to the sensing node SEN, a second end thereof may be connected to the seventh switch S7, and a gate electrode thereof may be connected to an output terminal of the amplifier 2217. For example, the sixth switch S6 may be implemented with a PMOS transistor.

The seventh switch S7 may output the replica current IL' in response to the second pulse $ED_{BST}$. A first end of the seventh switch S7 may be connected to the second end of the sixth switch S6, and a second end of the seventh switch S7 may be connected to a node Nc. The node Nc may be not a ground node but a node where the sensing resistor Rsen and the sensing capacitor Csen are connected in common. A gate electrode of the seventh switch S7 may be connected to an output terminal of the second emulated duty generator 2212 (refer to FIG. 15). For example, the seventh switch S7 may be implemented with a PMOS transistor.

In an embodiment, the current sensor 2215 may be a kind of current mirror configured to generate the replica current IL' from a current flowing through the inductive element "L" (refer to FIG. 3). For example, the replica current IL' may include pulses that change between logic high and logic low as the seventh switch S7 is turned on and turned off. However, because the replica current IL' flows to an RC filter composed of the sensing resistor Rsen and the sensing capacitor Csen, the sensing voltage Vsen may change to a DC component.

Referring to FIG. 17, when the second pulse $ED_{BST}$ with the duty ratio $D_{BST}$ is input to the gate electrode of the seventh switch S7, the replica current IL' may be output from the seventh switch S7. Because the seventh switch S7 is implemented with a PMOS transistor, the replica current IL' may have a phase opposite to that of the second pulse $ED_{BST}$ and may have the duty ratio of $(1-D_{BST})$. Accordingly, the voltage of the node Nc, which is formed by the replica current IL', may be expressed by Equation 1 below. Herein, V0 may be an initial value (i.e., a constant) of the voltage of the node Nc, and Ri may be a value obtained by multiplying a resistance of the sensing resistor Rsen and a sensing ratio of the first switch S1 and the fifth switch S5.

$$VL = IL \times (1 - D_{BST}) \times Ri + V0 \quad \text{[Equation 1]}$$

Meanwhile, in the case where Equation 1 above is applied to FIG. 15, the current sensor 2215 may output the voltage VL as the sensing voltage Vsen; in the buck mode, because the duty ratio $D_{BST}$ of the second pulse $ED_{BST}$ is "0", the current sensor 2215 may output the voltage VL.

Figure 18:
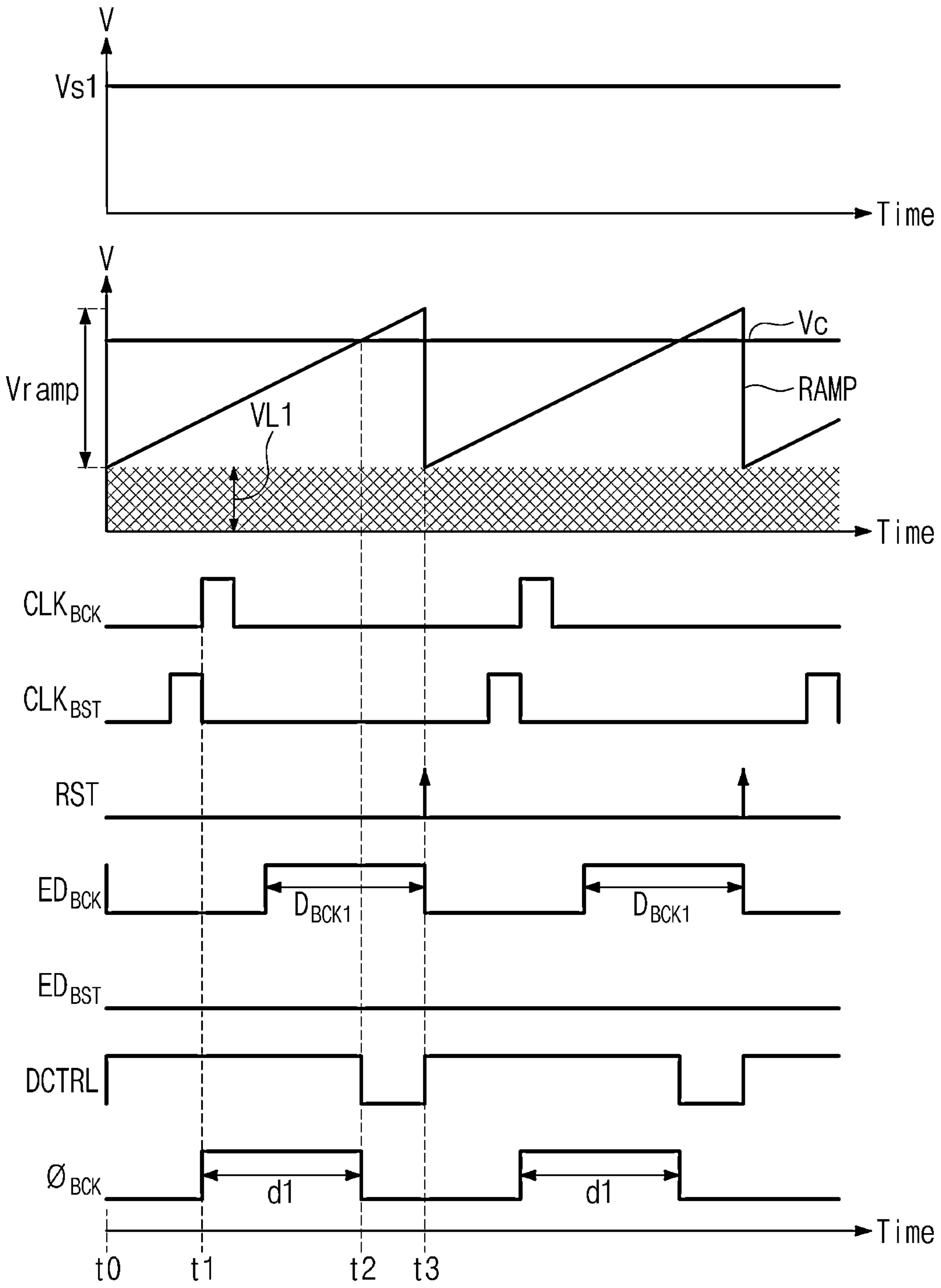
FIG. 18 illustrates waveforms of signals associated with an electronic circuit of the present disclosure before a decrease in an input voltage in a buck mode.

FIG. 18 illustrates waveforms of signals associated with an electronic circuit of the present disclosure before the decrease in the input voltage Vs in a buck mode. For better understanding, FIG. 18 will be described together with reference to FIGS. 12 and 15. A level of the input voltage Vs before a magnitude change may be Vs1. For example, the first emulated duty generator 2211 may generate the first pulse $ED_{BCK}$ with a duty ratio $D_{BCK1}$ of Vo/Vs based on the input voltage Vs with the level of Vs1 and the output voltage Vo. The second emulated duty generator 2212 may generate the second pulse $ED_{BST}$ with the duty ratio of "0" based on the input voltage Vs with the level of Vs1 and the output voltage Vo.

The reset signal RST may be based on the first pulse $ED_{BCK}$ and the second pulse $ED_{BST}$. For example, the multiplexer 2213 may receive the first pulse $ED_{BCK}$ and the second pulse $ED_{BST}$ and may add the first pulse $ED_{BCK}$ and the second pulse $ED_{BST}$. The multiplexer 2213 may output the reset signal RST that is activated at the falling edge of a pulse obtained by adding the first pulse $ED_{BCK}$ and the second pulse $ED_{BST}$.

The ramp signal RAMP may be reset at the activation timing of the reset signal RST. For example, the ramp generator 2214 may generate the ramp signal RAMP that is reset at points in time t0 and t3 based on the reset signal RST. A reset period of the reset signal RST may be (t3−t0). The magnitude (i.e., amplitude) of the ramp signal RAMP may be Vramp. A voltage VL1 may be a voltage corresponding to the inductor current IL flowing through the inductive element "L" (refer to FIG. 3). For example, the current sensor 2215 may sense the inductor current IL flowing through the inductive element "L" (refer to FIG. 3) and may output the voltage VL1. The adder 2216 may add the ramp signal RAMP and the voltage VL, and the added voltage may be output to the negative input terminal of the comparator 2250 as the emulated voltage Veml.

The compensation voltage Vc may be based on the reference voltage Vref and the feedback voltage VFB. For example, the feedback circuit 2220 may output the feedback voltage VFB based on the output voltage Vo. The amplifier 2230 may amplify a difference between the reference voltage Vref and the feedback voltage VFB to output the compensation voltage Vc. The amplifier 2230 may output the compensation voltage Vc to the positive input terminal of the comparator 2250.

The control signal DCTRL may be a signal that is based on a comparison result of the compensation voltage Vc and the emulated voltage Veml. For example, the comparator 2250 may compare the compensation voltage Vc and the emulated voltage Veml and may output a value (e.g., "1") corresponding to logic high in a time interval where a value of the emulated voltage Veml is greater than a value of the compensation voltage Vc. The comparator 2250 may output a value (e.g., "0") corresponding to logic low in a time interval where the value of the emulated voltage Veml is smaller than the value of the compensation voltage Vc. For example, the control signal DCTRL may be set to "1" in a time interval from t0 to t2 and may be set to "O" in a time interval from t2 to t3.

The first gate control signal $Ø_{BCK}$ may be based on the first clock $CLK_{BCK}$ and the control signal DCTRL. For example, the first gate control signal $Ø_{BCK}$ may have a value of logic high (e.g., "1") in a time interval from the rising edge t1 of the first clock $CLK_{BCK}$ to the falling edge t2 of the control signal DCTRL. Before the magnitude of the input voltage Vs changes, the duty ratio of the first gate control signal $Ø_{BCK}$ may be d1.

Figure 19:
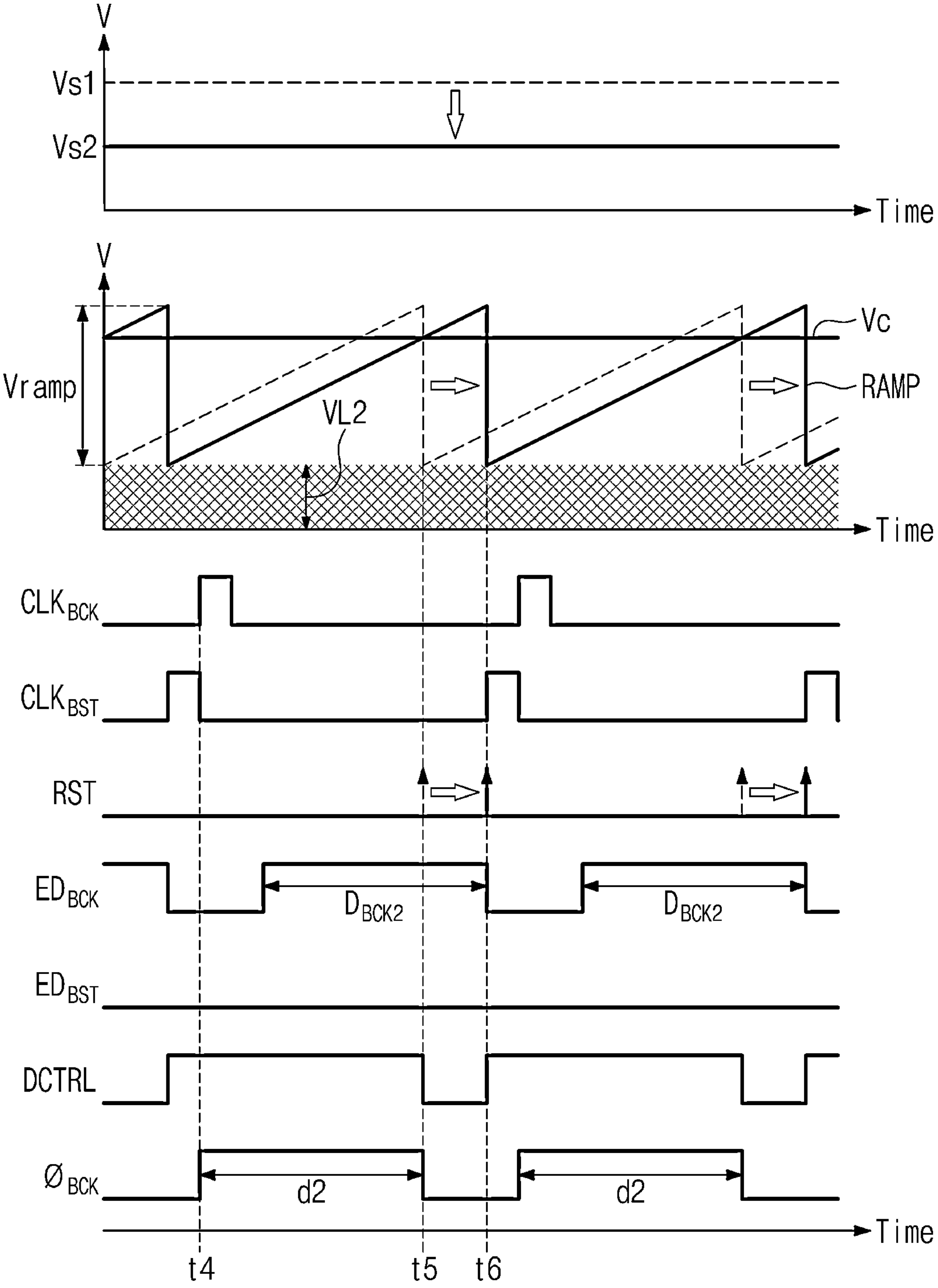
FIG. 19 illustrates waveforms of signals associated with an electronic circuit of the present disclosure after a decrease in an input voltage in a buck mode.

FIG. 19 illustrates waveforms of signals associated with an electronic circuit of the present disclosure after the decrease in the input voltage Vs in a buck mode. For better understanding, FIG. 19 will be described together with reference to FIGS. 12 and 15. A level of the input voltage Vs after a magnitude change may be Vs2. The first emulated duty generator 2211 may receive the input voltage Vs and the output voltage Vo and may generate the first pulse $ED_{BCK}$ with a duty ratio $D_{BCK2}$ based on the input voltage Vs and the output voltage Vo. Because the level of the input voltage Vs decreases, the duty ratio $D_{BCK2}$ may be greater than the duty ratio $D_{BCK1}$. That is, a point in time of the falling edge of the first pulse $ED_{BCK}$ of FIG. 19 may be delayed with respect to the falling edge of the first pulse $ED_{BCK}$ of FIG. 18.

The reset signal RST may be based on the first pulse $ED_{BCK}$ of which duty ratio increases to $D_{BCK2}$ and the second pulse $ED_{BST}$. For example, the multiplexer 2213 may add the first pulse $ED_{BCK}$ with the duty ratio $D_{BCK2}$ and the second pulse $ED_{BST}$ and may output the reset signal RST that is activated at the falling edge of the pulse obtained by adding the first pulse $ED_{BCK}$ and the second pulse $ED_{BST}$. Accordingly, the timing of the reset signal RST may be delayed with respect to the timing of the reset signal RST of FIG. 18.

The ramp signal RAMP may be based on the delayed reset signal RST, and the timing at which the ramp signal RAMP is reset by the delayed reset signal RST may be delayed to t6. For example, the ramp generator 2214 may generate the ramp signal RAMP that is reset at the activation timing of the reset signal RST.

In general, when there occurs the ripple (i.e., a transient ripple) that the output voltage Vo changes in a moment due to the change in the input voltage Vs, there is a need to change the compensation voltage Vc for the purpose of changing the duty ratio of the first gate control signal $Ø_{BCK}$ and/or the second gate control signal $Ø_{BST}$. However, because the change in the compensation voltage Vc requires the change in the feedback voltage VFB (or the output voltage Vo), it is difficult to stabilize the output voltage Vo.

However, according to the present disclosure, without the change in the compensation voltage Vc, it may be possible to increase the duty ratio of the first gate control signal $Ø_{BCK}$ and/or the second gate control signal $Ø_{BST}$ by using the delayed ramp signal RAMP. As a result, because it is possible to compensate for the compensation voltage Vc to be changed due to the change in the intensity of the input voltage Vs, the output voltage Vo may be effectively stabilized without the change in the compensation voltage Vc in a time interval where the operation mode of the buck-boost converter 2100 changes.

Meanwhile, according to an embodiment of the present disclosure, the process of stabilizing the output voltage Vo without the change in the compensation voltage Vc will be described in detail through Equations below. The magnitude of the compensation voltage Vc may be expressed by Equation 2 below.

$$Vc = VL + V_{ramp} \times \phi_{BCK} \quad \text{[Equation 2]}$$

In the buck mode, the magnitude of the compensation voltage Vc to be changed due to the change in the input voltage Vs may be obtained by differentiating Equation 2 above, which may be expressed by Equation 3 below. The reason is that the variation of the output voltage VL of the current sensor 2215 according to the decrease in the input voltage Vs in the buck mode are "0".

$$\Delta Vc(\text{buck}) = \Delta\phi_{BCK} \times V_{ramp} \quad \text{[Equation 3]}$$

However, the value of the compensation voltage Vc to be changed, which is expressed by Equation 3 above, may be cancelled out by the increased duty ratio of the first pulse $ED_{BCK}$. Equation 3 to which the increased duty ratio of the first pulse $ED_{BCK}$ is applied may be expressed by Equation 4 below.

$$\Delta Vc(\text{buck}) = (\Delta\phi_{BCK} - \Delta D_{BCK}) \times V_{ramp} \quad \text{[Equation 4]}$$

Referring to FIG. 19 and Equation 4 above, because the variation $\Delta Ø_{BCK}$ of the first gate control signal $Ø_{BCK}$ is equal to the variation $\Delta D_{BCK}$ of the duty ratio of the first pulse $ED_{BCK}$, a value of the compensation voltage Vc to be changed may be "0".

Figure 20:
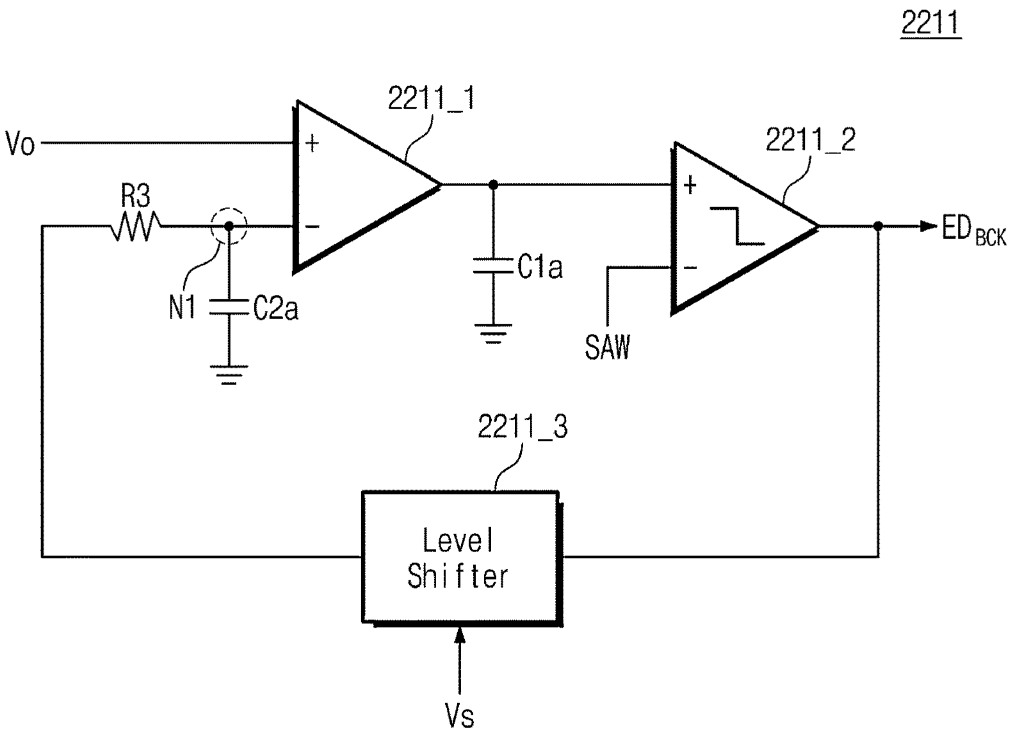
FIG. 20 illustrates a configuration of a first emulated duty generator of FIG. 13.
Figure 21:
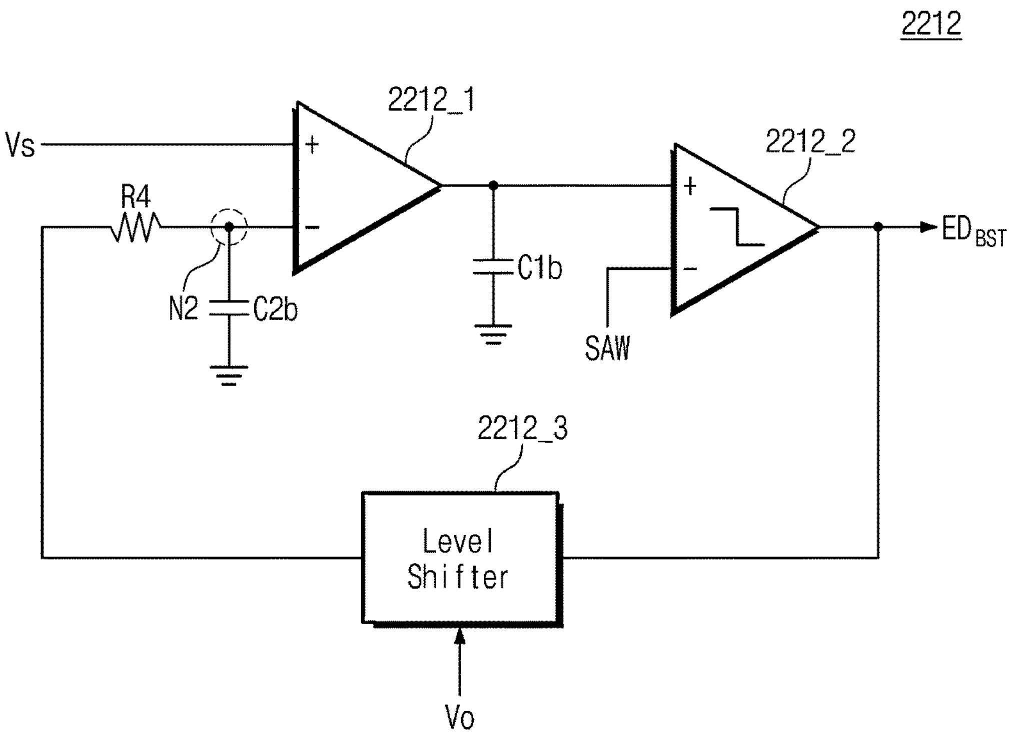
FIG. 21 illustrates a configuration of a second emulated duty generator of FIG. 13.

FIG. 20 illustrates a configuration of the first emulated duty generator 2211 of FIG. 13. FIG. 21 illustrates a configuration of the second emulated duty generator 2212 of FIG. 13. Referring to FIG. 20, the first emulated duty generator 2211 may include an amplifier 2211_1, a comparator 2211_2, a level shifter 2211_3, a resistor R3, and a capacitor C1*a*.

A first input terminal (e.g., a positive input terminal) of the amplifier 2211_1 may receive the output voltage Vo. A second input terminal (e.g., a negative input terminal) of the amplifier 2211_1 may receive a voltage of a node N1. The amplifier 2211_1 may be configured to amplify a difference between the output voltage Vo and the voltage of the node N1. The capacitor C1*a* for output stabilization may be connected between an output terminal of the amplifier 2211_1 and a ground node.

A first input terminal (e.g., a positive input terminal) of the comparator 2211_2 may be connected to the output terminal of the amplifier 2211_1. A second input terminal (e.g., a negative input terminal) of the comparator 2211_2 may receive a sawtooth. The comparator 2211_2 may compare an output signal of the amplifier 2211_1 and the sawtooth and may output the first pulse $ED_{BCK}$ as a comparison result. The comparator 2211_2 may output a value (e.g., "1") corresponding to logic high in a time interval where the output signal of the amplifier 2211_1 is greater in value than the sawtooth and may output a value (e.g., "0") corresponding to logic low in a time interval where the output signal of the amplifier 2211_1 is smaller in value than the sawtooth.

The level shifter 2211_3 may receive the input voltage Vs and the first pulse $ED_{BCK}$. The level shifter 2211_3 may shift the level of the first pulse $ED_{BCK}$ based on the input voltage Vs. For example, a value of the first pulse $ED_{BCK}$ of which level is shifted may be greater or smaller than the level of the first pulse $ED_{BCK}$ output from the comparator 2211_2.

The first pulse $ED_{BCK}$ of which level is shifted may be input to an RC filter composed of the resistor R3 and a capacitor C2*a*, and the first pulse $ED_{BCK}$ with a specific duty ratio may be converted into a voltage with a DC value. The first pulse $ED_{BCK}$ converted into the DC value may be input to the second input terminal of the amplifier 2211_1.

Referring to FIG. 21, a configuration and an operation of the second emulated duty generator 2212 may be substantially the same as the configuration and the operation of the first emulated duty generator 2211 of FIG. 20. Thus, additional description associated with the same configuration and operation will be omitted to avoid redundancy. However, a first input terminal of an amplifier 2212_1 of the second emulated duty generator 2212 may receive the input voltage Vs. A level shifter 2212_3 of the second emulated duty generator 2212 may operate based on the output voltage Vo.

Figure 22:
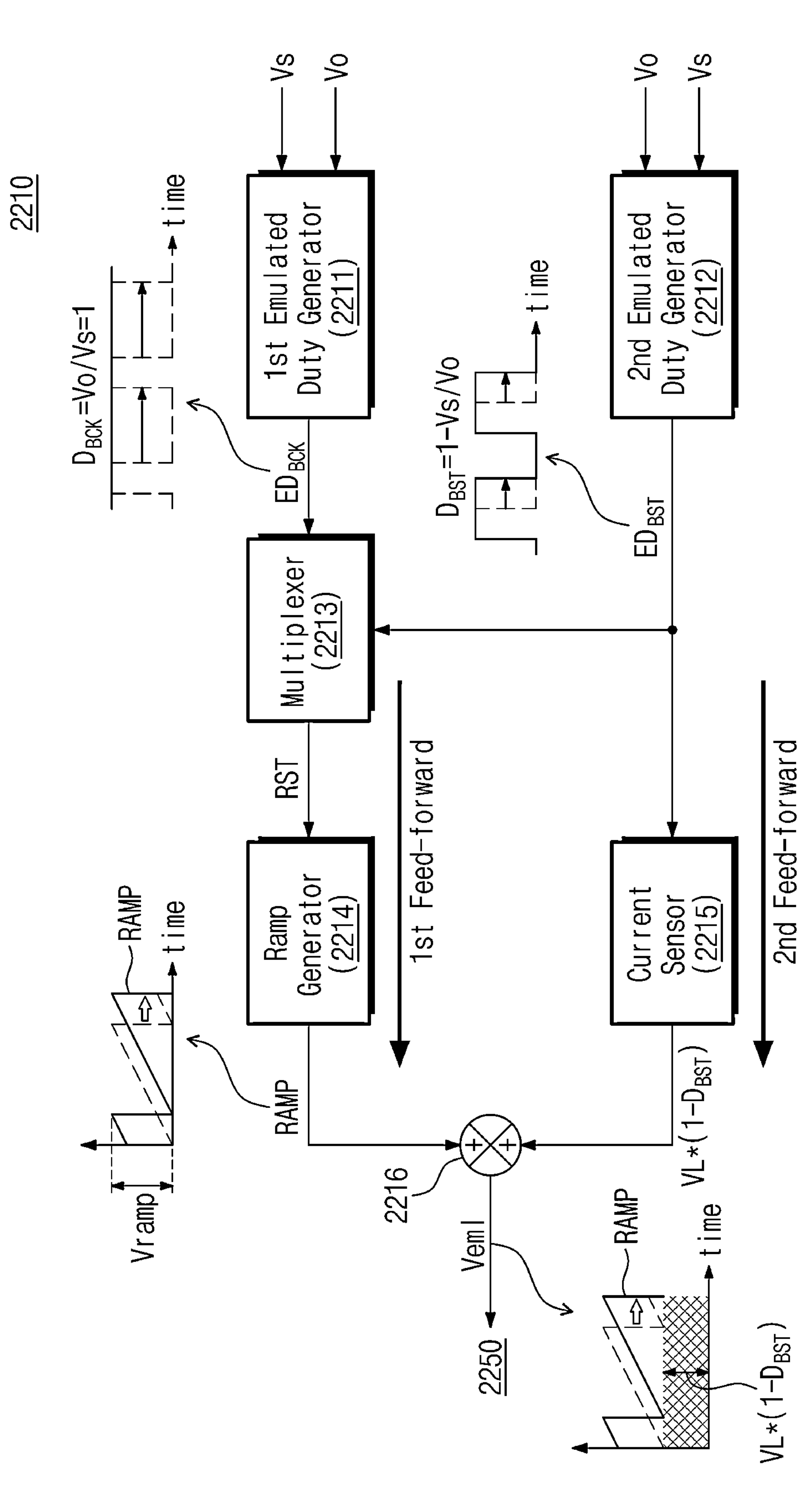
FIG. 22 illustrates how an emulated duty controller operates in a boost mode.

FIG. 22 illustrates how the emulated duty controller 2210 operates in a boost mode. In the boost mode of the buck-boost converter 2100 (refer to FIG. 3), the first emulated duty generator 2211 may generate the first pulse $ED_{BCK}$ with the duty ratio $D_{BCK}$ of Vo/Vs based on the input voltage Vs and the output voltage Vo. Because the magnitude of the input voltage Vs is smaller than the magnitude of the output voltage Vo, the duty ratio $D_{BCK}$ of Vo/Vs may be "1". The second emulated duty generator 2212 may generate the second pulse $ED_{BST}$ with the duty ratio $D_{BST}$ of (1-Vs/Vo).

The multiplexer 2213 may add the first pulse $ED_{BCK}$ output from the first emulated duty generator 2211 and the second pulse $ED_{BST}$ output from the second emulated duty generator 2212. The multiplexer 2213 may output the reset signal RST, which is activated at the falling edge of a pulse obtained by adding the first pulse $ED_{BCK}$ and the second pulse $ED_{BST}$, to the ramp generator 2214.

The ramp generator 2214 may generate the ramp signal RAMP that is reset at the falling edge of the reset signal RST. In the boost mode, when the magnitude of the input voltage Vs decreases, because the duty ratio of the second pulse $ED_{BST}$ increases (i.e., the timing of the falling edge is delayed), the timing to reset the ramp signal RAMP may also be delayed.

The current sensor 2215 may sense the inductor current IL flowing through the inductive element "L" (refer to FIG. 3) and may output a voltage of "$VL\times(1-D_{BST})$" corresponding to the inductor current IL as the sensing voltage Vsen. The process of outputting the sensing voltage Vsen is described in detail with reference to FIGS. 16 and 17, and thus, additional description will be omitted to avoid redundancy.

The adder 2216 may output the emulated voltage Veml by adding the ramp signal RAMP output from the ramp generator 2214 and the voltage "$VL\times(1-D_{BST})$" output from the current sensor 2215. The emulated voltage Veml may be a ramp signal that has a minimum value of "$VL\times(1-D_{BST})$" and a maximum value of "$Vramp+VL\times(1-D_{BST})$" as illustrated in FIG. 22. The adder 2216 may output the emulated voltage Veml to the comparator 2250.

Figure 23:
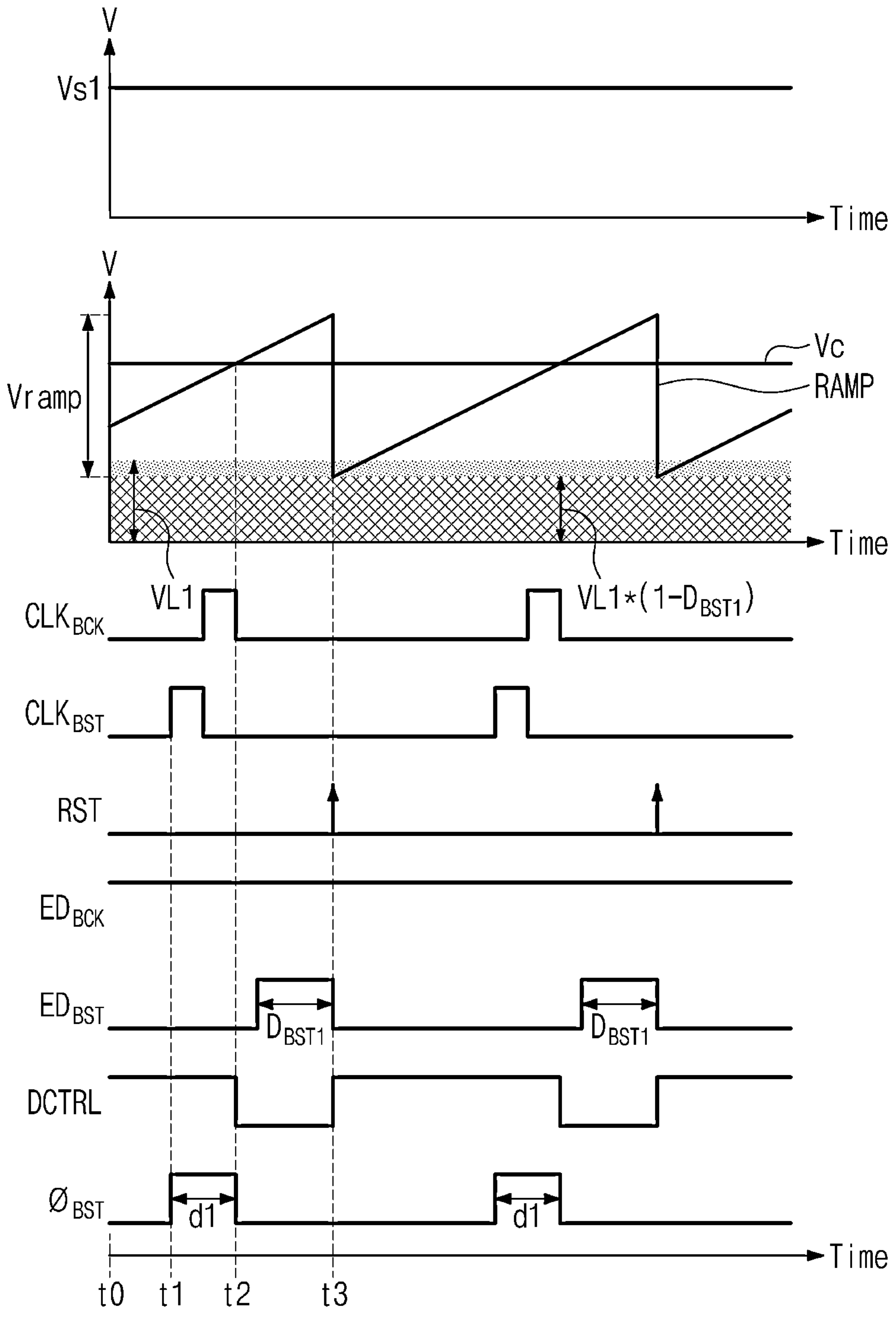
FIG. 23 illustrates waveforms of signals associated with an electronic circuit of the present disclosure, before a decrease in an input voltage in a boost mode.
Figure 24:
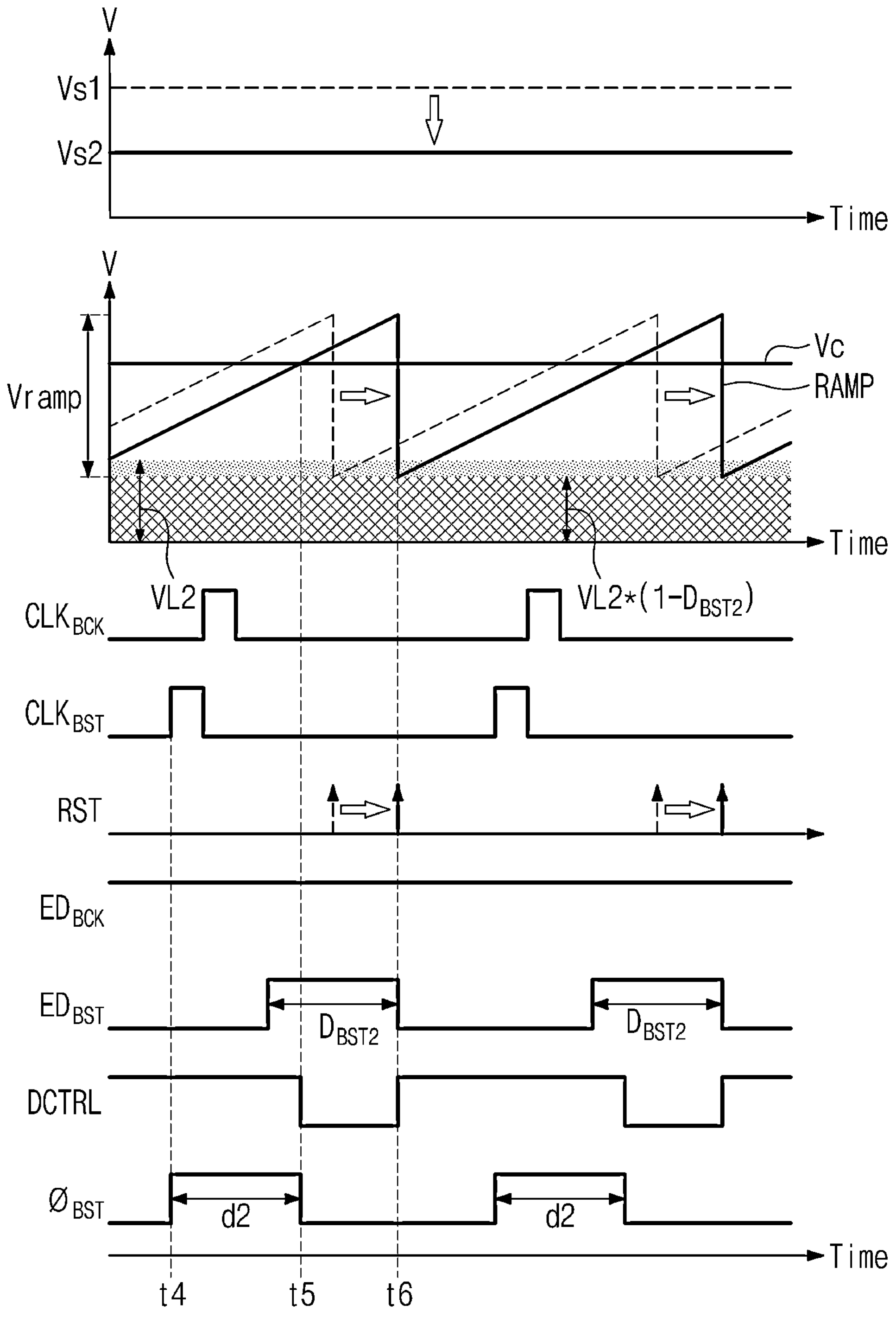
FIG. 24 illustrates waveforms of signals associated with an electronic circuit of the present disclosure, after a decrease in an input voltage in a boost mode.

FIG. 23 illustrates waveforms of signals associated with an electronic circuit of the present disclosure before the decrease in the input voltage Vs in a boost mode. FIG. 24 illustrates waveforms of signals associated with an electronic circuit of the present disclosure after the decrease in the input voltage Vs in a boost mode. For better understanding, FIG. 24 will be described together with reference to FIGS. 12, 22, and 23.

The first emulated duty generator 2211 may receive the input voltage Vs and the output voltage Vo and may generate the first pulse $ED_{BCK}$ with a duty ratio of "1" based on the input voltage Vs and the output voltage Vo. A level of the input voltage Vs before the magnitude change may be Vs1 and a level of the input voltage Vs after the magnitude change may be Vs2. The second emulated duty generator 2212 may generate the second pulse $ED_{BST}$ with a duty ratio $D_{BST1}$ of (1-Vs/Vo) based on the input voltage Vs and the output voltage Vo. The duty ratio $D_{BST1}$ before the level of the input voltage Vs changes may be smaller than a duty ratio $D_{BST2}$ after the level of the input voltage Vs changes to Vs2. That is, a point in time of the falling edge of the second pulse $ED_{BST}$ of FIG. 24 may be delayed with respect to the falling edge of the second pulse $ED_{BST}$ of FIG. 23.

The multiplexer 2213 may receive the first pulse $ED_{BCK}$ and the second pulse $ED_{BST}$, may add the first pulse $ED_{BCK}$ and the second pulse $ED_{BST}$, and may output the reset signal RST that is activated at the falling edge of the pulse obtained by adding the first pulse $ED_{BCK}$ and the second pulse $ED_{BST}$. The timing of the reset signal RST of FIG. 24 may be delayed with respect to the timing of the reset signal RST of FIG. 23.

The ramp signal RAMP may be reset at the activation timing of the reset signal RST and may be generated by the ramp generator 2214. The magnitude (i.e., amplitude) of the ramp signal RAMP may be Vramp. A voltage of "$VL2\times(1-D_{BST2})$" may be a voltage corresponding to the inductor current IL (refer to FIG. 3) and may be generated as the current sensor 2215 senses an inductor current flowing through the inductive element "L" (refer to FIG. 4). A sum of the ramp signal RAMP and the voltage of "$VL2\times(1-D_{BST2})$" may be the emulated voltage Veml. For example, the adder 2216 may generate the emulated voltage Veml by adding the ramp signal RAMP and the voltage of "VL2×

$(1-D_{BST2})$" and may output the emulated voltage Veml to the negative input terminal of the comparator 2250.

The compensation voltage Vc may be based on the feedback voltage VFB. In detail, the feedback circuit 2220 may output the feedback voltage VFB based on the output voltage Vo. The amplifier 2230 may amplify a difference between the reference voltage Vref and the feedback voltage VFB to output the compensation voltage Vc. The amplifier 2230 may output the compensation voltage Vc to the positive input terminal of the comparator 2250. The control signal DCTRL may be generated based on the compensation voltage Vc and the emulated voltage Veml. For example, the comparator 2250 may compare the compensation voltage Vc and the emulated voltage Veml and may output a value (e.g., "1") corresponding to logic high in a time interval where a value of the emulated voltage Veml is greater than a value of the compensation voltage Vc. Alternatively, the comparator 2250 may output a value (e.g., "0") corresponding to logic low in a time interval where the value of the emulated voltage Veml is smaller than the value of the compensation voltage Vc.

The control logic circuit 2260 may output the second gate control signal $\emptyset_{BST}$ based on the second clock $CLK_{BST}$ and the control signal DCTRL. The second gate control signal $\emptyset_{BST}$ may have a value of logic high (e.g., "1") in a time interval from the rising edge of the second clock $CLK_{BST}$ to the falling edge of the control signal DCTRL. For example, in FIG. 23, the second gate control signal $\emptyset_{BST}$ may be activated in a time interval from t1 to t2, and the duty ratio of the second gate control signal $\emptyset_{BST}$ may be d1. In FIG. 24, the second gate control signal $\emptyset_{BST}$ may be activated in a time interval from t4 to t5, and the duty ratio of the second gate control signal $\emptyset_{BST}$ may be d2.

According to the above embodiment, without the change in the compensation voltage Vc, it may be possible to increase the duty ratio of the second gate control signal $\emptyset_{BST}$ by controlling the control signal DCTRL by using the delayed ramp signal RAMP. That is, because it is possible to compensate for the compensation voltage Vc to be changed due to the change in the intensity of the input voltage Vs, the output voltage Vo may be effectively stabilized without the change in the compensation voltage Vc in a time interval where the operation mode of the buck-boost converter 2100 changes.

In detail, because the magnitude of the compensation voltage Vc to be changed due to the change in the input voltage Vs is expressed by Equation 2 above and the voltage VL is expressed by Equation 1 above, the magnitude of the compensation voltage Vc to be changed due to the change in the input voltage Vs in the boost mode may be expressed by Equation 5 below.

$$\Delta Vc(\text{boost}) = \Delta\emptyset_{BCK} \times V_{ramp} + IL \times (1 - D_{BST}) \times Ri \quad \text{[Equation 5]}$$

Because a relationship of $Io=(1-D_{BST})\times IL$ exists between the inductor current IL and the load current Io in the boost mode, Equation 5 may be expressed as Equation 6 below.

$$\Delta Vc(\text{boost}) = \Delta\emptyset_{BCK} \times V_{ramp} + \frac{Io}{(1 - D_{BST})} \times (1 - D_{BST}) \times Ri \quad \text{[Equation 6]}$$

However, the value of the compensation voltage Vc to be the changed due to the change of the input voltage Vs, which is expressed by Equation 6 above, may be cancelled out by the variation of the duty ratio of the second pulse $ED_{BST}$. That is, Equation 6 to which the increased duty ratio of the second pulse $ED_{BST}$ is applied may be expressed by Equation 7 below.

$$\Delta Vc(\text{boost}) = (\Delta\emptyset_{BST} - \Delta D_{BST}) \times V_{ramp} + \left[\frac{Io}{(1 - D_{BST1})} \times (1 - D_{BST1}) - \frac{Io}{(1 - D_{BST2})} \times (1 - D_{BST2})\right] \times Ri \quad \text{[Equation 7]}$$

Referring to FIG. 24 and Equation 7 above, because the variation $\Delta\emptyset_{BST}$ of the second gate control signal $\emptyset_{BST}$ is equal to the variation $\Delta D_{BST}$ of the duty ratio of the second pulse $ED_{BST}$, a value of the compensation voltage Vc to be changed may be "0".

Figure 25:
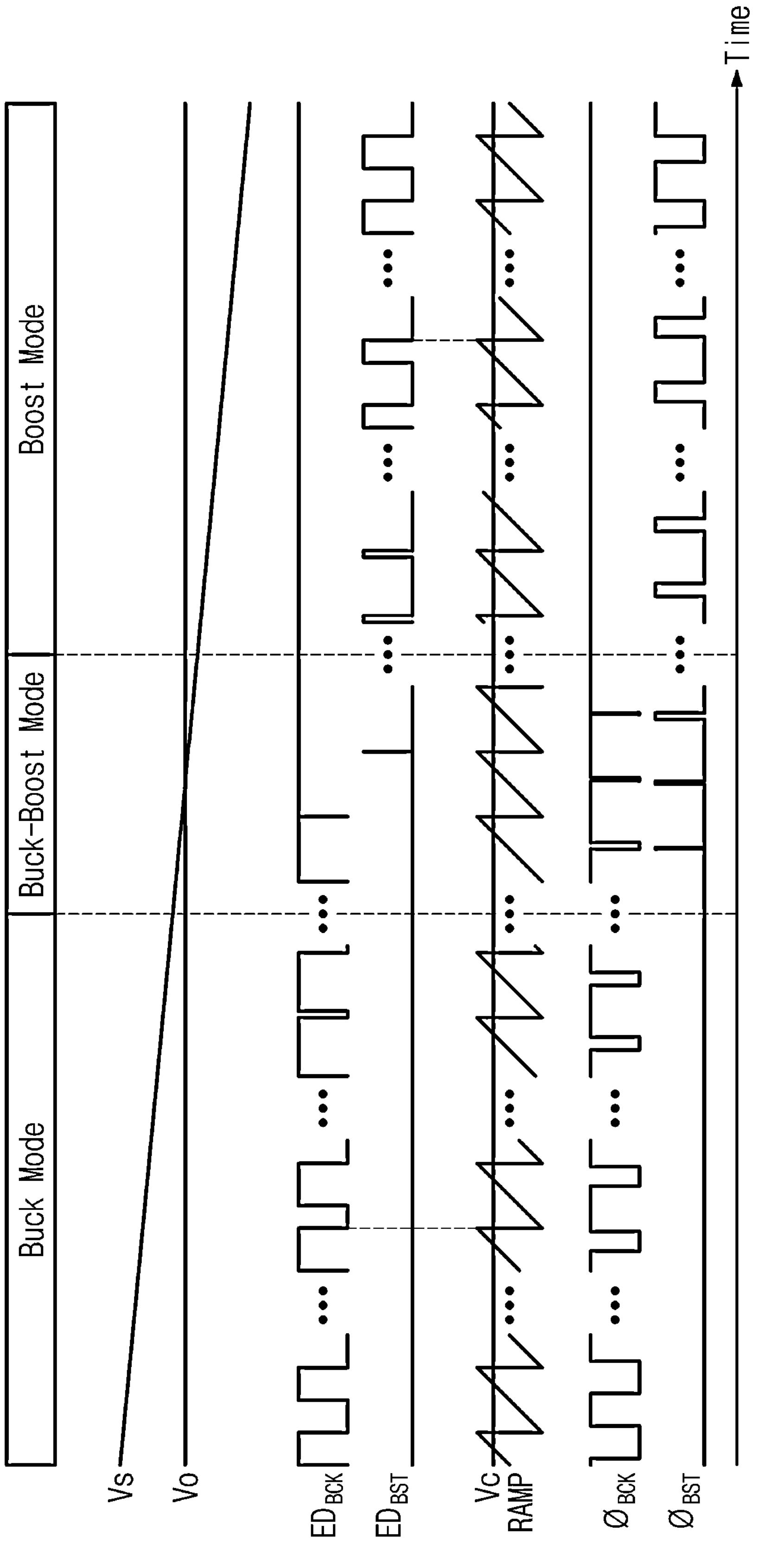
FIG. 25 illustrates various waveforms according to a decrease in a value of an input voltage.

FIG. 25 illustrates various waveforms according to a decrease in a value of the input voltage Vs. Referring to FIG. 25, as the input voltage Vs decreases, the buck-boost converter 2100 (refer to FIG. 3) may sequentially operate in the buck mode, the buck-boost mode, and the boost mode. As described with reference to FIGS. 4 to 6, while the buck-boost converter 2100 (refer to FIG. 3) operates in the buck mode, the duty ratio of the first pulse $ED_{BCK}$ increases as the value of the input voltage Vs decreases. As such, the timing to reset the ramp signal RAMP may be delayed, and the duty ratio of the first gate control signal $\emptyset_{BCK}$ may increase.

Afterwards, in a specific time interval of the input voltage Vs, the buck-boost converter 2100 (refer to FIG. 3) may operate in the buck-boost mode. As described with reference to FIGS. 10 and 11, while the buck-boost converter 2100 (refer to FIG. 3) operates in the buck-boost mode, a characteristic of the buck mode and a characteristic of the boost mode may exist together. That is, the duty ratio of the first pulse $ED_{BCK}$ may become closer to "1" and may finally converge to "1". Also, the duty ratio of the second pulse $ED_{BST}$ may slowly increase from "O". The duty ratio of the first gate control signal $\emptyset_{BCK}$ may also become closer to "1" and may finally converge to "1", and the duty ratio of the second gate control signal $\emptyset_{BST}$ may slowly increase from "0".

Afterwards, the buck-boost converter 2100 (refer to FIG. 3) may operate in the boost mode from a point in time when the duty ratio of the first gate control signal $\emptyset_{BCK}$ is set to "1". As described with reference to FIGS. 7 to 9, the duty ratio of the second pulse $ED_{BST}$ increases as the value of the input voltage Vs decreases. As such, the timing to reset the ramp signal RAMP may be delayed, and the duty ratio of the second gate control signal $\emptyset_{BST}$ may increase.

As described above, in the case of performing first feed-forward compensation, an electronic device of the present disclosure may delay a reset timing of a ramp signal by using a pulse with an emulated duty ratio. As a result, as the level of the compensation voltage Vc is uniformly maintained even though the input voltage Vs changes, the output ripple may be seamlessly compensated for. In addition, in the case of performing second feed-forward compensation, as an inductor current is sensed by using a pulse with an emulated duty ratio, the sensing voltage Vsen that is uniformly maintained even in the change in the input voltage Vs may be output. According to an embodiment of the present disclosure, there may be provided a buck-boost converter capable of seamlessly compensating for an output ripple at the boundary of a buck mode and a boost mode. According to an embodiment of the present disclosure, feed-forward compensation may be provided by delaying a reset timing of a ramp signal by using a pulse with an emulated duty ratio. According to an embodiment of the present disclosure, there may be provided feed-forward compensation compensating for a voltage corresponding to an inductor current by using a pulse with an emulated duty ratio.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic circuit, comprising:

a buck-boost converter, including:

an inductive element;

a first switch electrically connected between an input terminal, which is configured to receive an input voltage, and a first end of the inductive element;

a second switch electrically connected between the first end of the inductive element and a ground electrode;

a third switch electrically connected between a second end of the inductive element and the ground electrode;

a fourth switch electrically connected between the second end of the inductive element and an output terminal, which is configured to output an output voltage;

a first driver configured to drive the first and second switches; and a second driver configured to drive the third and fourth switches; and a controller configured to:

generate a ramp signal having a reset timing that is delayed as the input voltage decreases, based on the input voltage and the output voltage;

generate a sensing voltage corresponding to an inductor current flowing through the inductive element;

generate a feedback voltage based on the output voltage;

generate a compensation voltage based on the feedback voltage and a reference voltage; and uniformly maintain the compensation voltage based on the ramp signal and the sensing voltage, and independent of any change in the input voltage.

2. The electronic circuit of claim 1, wherein the controller includes:

an emulated duty controller configured to generate the ramp signal having the reset timing that is delayed depending on a decrease in the input voltage, and the sensing voltage corresponding to the inductor current flowing through the inductive element, based on the input voltage and the output voltage, and further configured to output an emulated voltage by adding the ramp signal and the sensing voltage;

a feedback circuit configured to generate the feedback voltage based on the output voltage;

a first amplifier configured to output the compensation voltage by comparing the feedback voltage and the reference voltage;

a first comparator configured to output a control signal by comparing the emulated voltage and the compensation voltage; and a control logic circuit configured to generate a first gate control signal for controlling the first driver and a second gate control signal for controlling the second driver, based on the control signal, a first clock, and a second clock.

3. The electronic circuit of claim 2, wherein the emulated duty controller includes:

a first emulated duty generator configured to generate a first pulse having a duty ratio that increases as the input voltage decreases, during a buck mode or a buck-boost mode of the buck-boost converter;

a second emulated duty generator configured to generate a second pulse having a duty ratio that increases as the input voltage decreases, during the buck-boost mode or a boost mode of the buck-boost converter;

a multiplexer configured to output a reset signal by adding the first pulse and the second pulse;

a ramp generator configured to generate the ramp signal having the reset timing that is delayed by the reset signal;

a current sensor configured to generate the sensing voltage, which corresponds to the inductor current flowing through the inductive element; and an adder configured to generate the emulated voltage by adding the ramp signal and the sensing voltage.

4. The electronic circuit of claim 3, wherein the first emulated duty generator includes:

a second amplifier configured to amplify a difference between an output voltage input through a first input terminal and a voltage of a first node;

a second comparator configured to generate the first pulse by comparing an amplification result of the second amplifier and a sawtooth waveform;

a first level shifter configured to shift a level of the first pulse based on the input voltage; and a first filter configured to convert the first pulse having a shifted level into a DC value.

5. The electronic circuit of claim 4, wherein the second emulated duty generator includes:

a third amplifier configured to amplify a difference between the input voltage, which is input through a first input terminal, and a voltage of a second node;

a third comparator configured to generate the second pulse by comparing an amplification result of the third amplifier and the sawtooth waveform;

a second level shifter configured to shift a level of the second pulse based on the output voltage; and a second filter configured to convert the second pulse having a shifted level, into a DC value.

6. The electronic circuit of claim 3, wherein the current sensor includes:

a fourth amplifier configured to amplify a difference between a voltage of a node extending between the first switch and the inductive element, and a voltage of a sensing node;

a fifth switch configured to output the input voltage in response to the first gate control signal;

a sixth switch configured to output the voltage of the sensing node in response to an output voltage of the fourth amplifier;

a seventh switch configured to output a replica current in response to the second pulse; and a third filter configured to output the sensing voltage based on the replica current.

7. The electronic circuit of claim 3, wherein the controller further includes:

a compensation circuit electrically connected to an output terminal of the first amplifier, said compensation circuit including a compensation resistor and a compensation capacitor electrically connected in series.

8. The electronic circuit of claim 2, wherein the feedback circuit includes at least two resistors and is configured to output the feedback voltage by dividing the output voltage.

9. The electronic circuit of claim 2, wherein the control logic circuit generates the first gate control signal, which transitions to a logic high in response to a rising edge of the first clock and transitions to a logic low in response to a falling edge of the control signal; and wherein the control logic circuit generates the second gate control signal, which transitions to a logic high in response to a rising edge of the second clock and transitions to a logic low in response to the falling edge of the control signal.

10. An electronic circuit, comprising:

a buck-boost converter, which includes an inductive element therein and is configured to output an output voltage in response to an input voltage; and a controller configured to control the buck-boost converter, said controller configured to:

perform first feed-forward compensation based on the input voltage and the output voltage, such that a reset timing of a ramp signal is delayed as the input voltage decreases;

perform second feed-forward compensation such that a sensing voltage corresponding to an inductor current flowing through the inductive element is generated;

generate a feedback voltage based on the output voltage;

generate a compensation voltage based on the feedback voltage and a reference voltage; and uniformly maintain the compensation voltage based on the first feed-forward compensation and the second feed-forward compensation, independent of a change in the input voltage.

11. The electronic circuit of claim 10, wherein the buck-boost converter includes:

a first switch electrically connected between an input terminal receiving the input voltage and a first end of the inductive element;

a second switch electrically connected between the first end of the inductive element and a ground electrode;

a third switch electrically connected between a second end of the inductive element and the ground electrode;

a fourth switch electrically connected between the second end of the inductive element and an output terminal outputting the output voltage;

a first driver configured to drive the first switch and the second switch; and a second driver configured to drive the third switch and the fourth switch.

12. The electronic circuit of claim 11, wherein the controller includes:

an emulated duty controller configured to generate the ramp signal having the reset timing that is delayed as the input voltage decreases, and the sensing voltage corresponding to the inductor current flowing through the inductive element, based on the input voltage and the output voltage, and further configured to output an emulated voltage by adding the ramp signal and the sensing voltage;

a feedback circuit configured to generate the feedback voltage based on the output voltage;

a first amplifier configured to output the compensation voltage by comparing the feedback voltage and the reference voltage;

a first comparator configured to output a control signal by comparing the emulated voltage and the compensation voltage; and a control logic circuit configured to generate a first gate control signal for controlling the first driver, and generate a second gate control signal for controlling the second driver based on the control signal, a first clock, and a second clock.

13. The electronic circuit of claim 12, wherein the emulated duty controller includes:

a first emulated duty generator configured to generate a first pulse having a duty ratio that increases as the input voltage decreases, during a buck mode or a buck-boost mode of the buck-boost converter;

a second emulated duty generator configured to generate a second pulse having a duty ratio that increases as the input voltage decreases, during the buck-boost mode or a boost mode of the buck-boost converter;

a multiplexer configured to output a reset signal in response to adding the first and second pulses;

a ramp generator configured to generate the ramp signal having a reset timing delayed by the reset signal;

a current sensor configured to generate the sensing voltage corresponding to the inductor current flowing through the inductive element; and an adder configured to generate the emulated voltage by adding the ramp signal and the sensing voltage.

14. The electronic circuit of claim 13, wherein the first emulated duty generator includes:

a second amplifier configured to amplify a difference between an output voltage input through a first input terminal and a voltage of a first node;

a second comparator configured to generate the first pulse by comparing an amplification result of the second amplifier and a sawtooth;

a first level shifter configured to shift a level of the first pulse based on the input voltage; and a first filter configured to convert the first pulse having a shifted level into a DC value; and wherein the second emulated duty generator includes:

a third amplifier configured to amplify a difference between an input voltage input through a first input terminal and a voltage of a second node;

a third comparator configured to generate the second pulse by comparing an amplification result of the third amplifier and the sawtooth;

a second level shifter configured to shift a level of the second pulse based on the output voltage; and a second filter configured to convert the second pulse having a shifted level into a DC value.

15. The electronic circuit of claim 13, wherein the current sensor includes:

a fourth amplifier configured to amplify a difference between a voltage of a node between the first switch and the inductive element and a voltage of a sensing node;

a fifth switch configured to output the input voltage in response to the first gate control signal;

a sixth switch configured to output the voltage of the sensing node in response to an output voltage of the fourth amplifier;

a seventh switch configured to output a replica current in response to the second pulse; and a third filter configured to output the sensing voltage based on the replica current.

16. The electronic circuit of claim 12, wherein the control logic circuit is configured to generate the first gate control signal, which transitions to logic high in response to a rising edge of the first clock and transitions to logic low in response to a falling edge of the control signal; and wherein the control logic circuit is configured to generate the second gate control signal, which transitions to the logic high in response to a rising edge of the second clock and transitions to the logic low in response to the falling edge of the control signal.

* * * * *